(12) United States Patent  (10) Patent No.: US 9,192,874 B2
Moll et al.  (45) Date of Patent: Nov. 24, 2015

(54) DIGITAL COLORING TOOLS KIT WITH DYNAMIC DIGITAL PAINT PALETTE

(71) Applicant: Crayola LLC, Easton, PA (US)

(72) Inventors: Joseph Thomas Moll, Bethlehem, PA (US); Brian Nemeckay, Belvidere, NJ (US); Stephen Weiss, Easton, PA (US)

(73) Assignee: Crayola, LLC, Easton, PA (US)

( * ) Notice: Subject to any disclaimer, the term of this patent is extended or adjusted under 35 U.S.C. 154(b) by 35 days.

(21) Appl. No.: 14/213,544

(22) Filed: Mar. 14, 2014

(65) Prior Publication Data

US 2014/0267189 A1  Sep. 18, 2014

Related U.S. Application Data

(60) Provisional application No. 61/788,371, filed on Mar. 15, 2013.

(51) Int. Cl.
*G06F 3/033* (2013.01)
*A63H 33/00* (2006.01)
*G06F 3/0354* (2013.01)
*G06T 15/00* (2011.01)
*G06F 1/20* (2006.01)
*G06F 3/0488* (2013.01)
*G06F 3/02* (2006.01)
*G06F 3/039* (2013.01)
*G06F 3/0484* (2013.01)

(52) U.S. Cl.
CPC  *A63H 33/00* (2013.01); *G06F 1/20* (2013.01); *G06F 3/0202* (2013.01); *G06F 3/039* (2013.01); *G06F 3/03545* (2013.01); *G06F 3/0488* (2013.01); *G06F 3/04845* (2013.01); *G06F 3/04886* (2013.01); *G06T 15/005* (2013.01)

(58) Field of Classification Search
None
See application file for complete search history.

(56) References Cited

U.S. PATENT DOCUMENTS

| 6,921,336 B1 | 7/2005 | Best |
| 8,493,408 B2 | 7/2013 | Williamson et al. |
| 2008/0156667 A1* | 7/2008 | Huggins ................ 206/1.8 |
| 2012/0122531 A1 | 5/2012 | Aoki |
| 2012/0122553 A1 | 5/2012 | Bunch |
| 2012/0142415 A1 | 6/2012 | Lindsay |
| 2013/0120281 A1 | 5/2013 | Harris |
| 2013/0120436 A1* | 5/2013 | Krishnaswamy et al. .... 345/594 |

OTHER PUBLICATIONS

First Action Interview Pre-Interview Communication dated Jun. 19, 2015 in U.S. Appl. No. 14/211,815, 5 pages.

* cited by examiner

*Primary Examiner* — Muhammad N Edun
(74) *Attorney, Agent, or Firm* — Shook, Hardy & Bacon, L.L.P.

(57) ABSTRACT

A digital coloring tools kit for creating a realistic painting experience for use with a touch-screen device is provided in embodiments of the invention. In some embodiments, the digital coloring tools kit includes a digital paintbrush tool, a digital stamper tool, a digital pattern roller, a digital airbrush tool, a digital paint palette, and a carrying case. In further embodiments, the invention includes an activation feature for a digital coloring tools application configured to generate a digital coloring environment upon activation and/or execution by a computing device, such as a touch-screen device. In some embodiments, the digital paint palette is configured to receive a first and second amount of a color for mixing, and subsequent painting with a digital paintbrush tool.

18 Claims, 18 Drawing Sheets

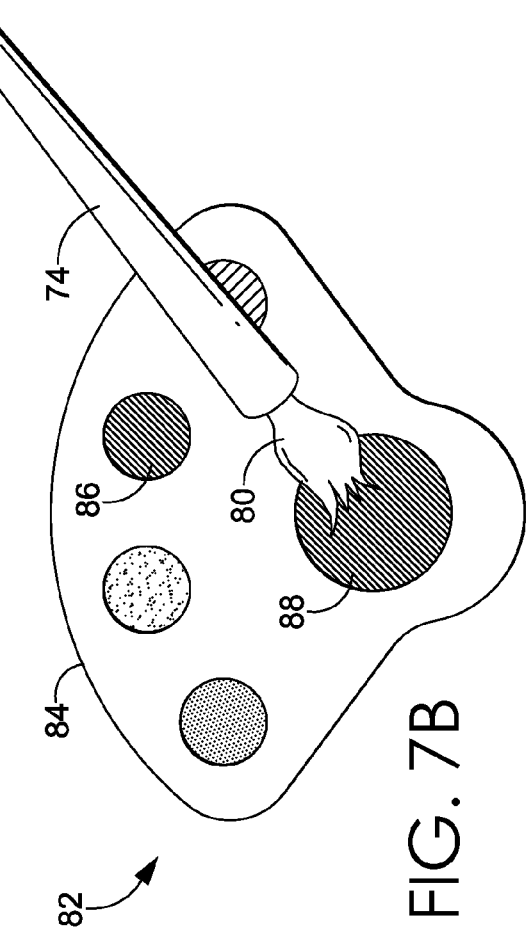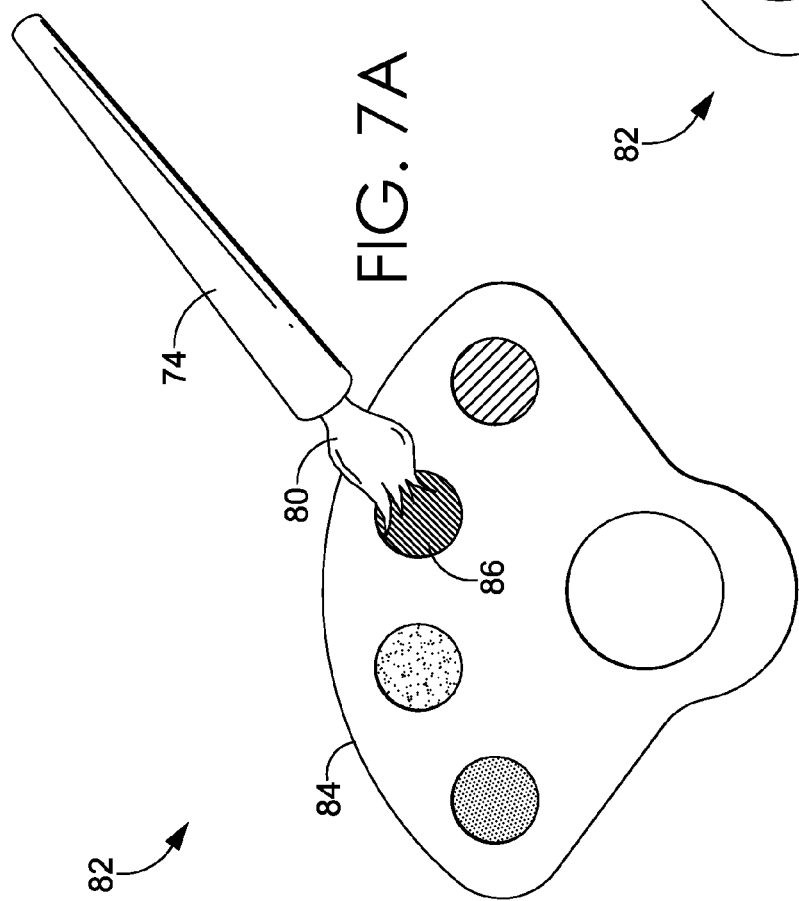

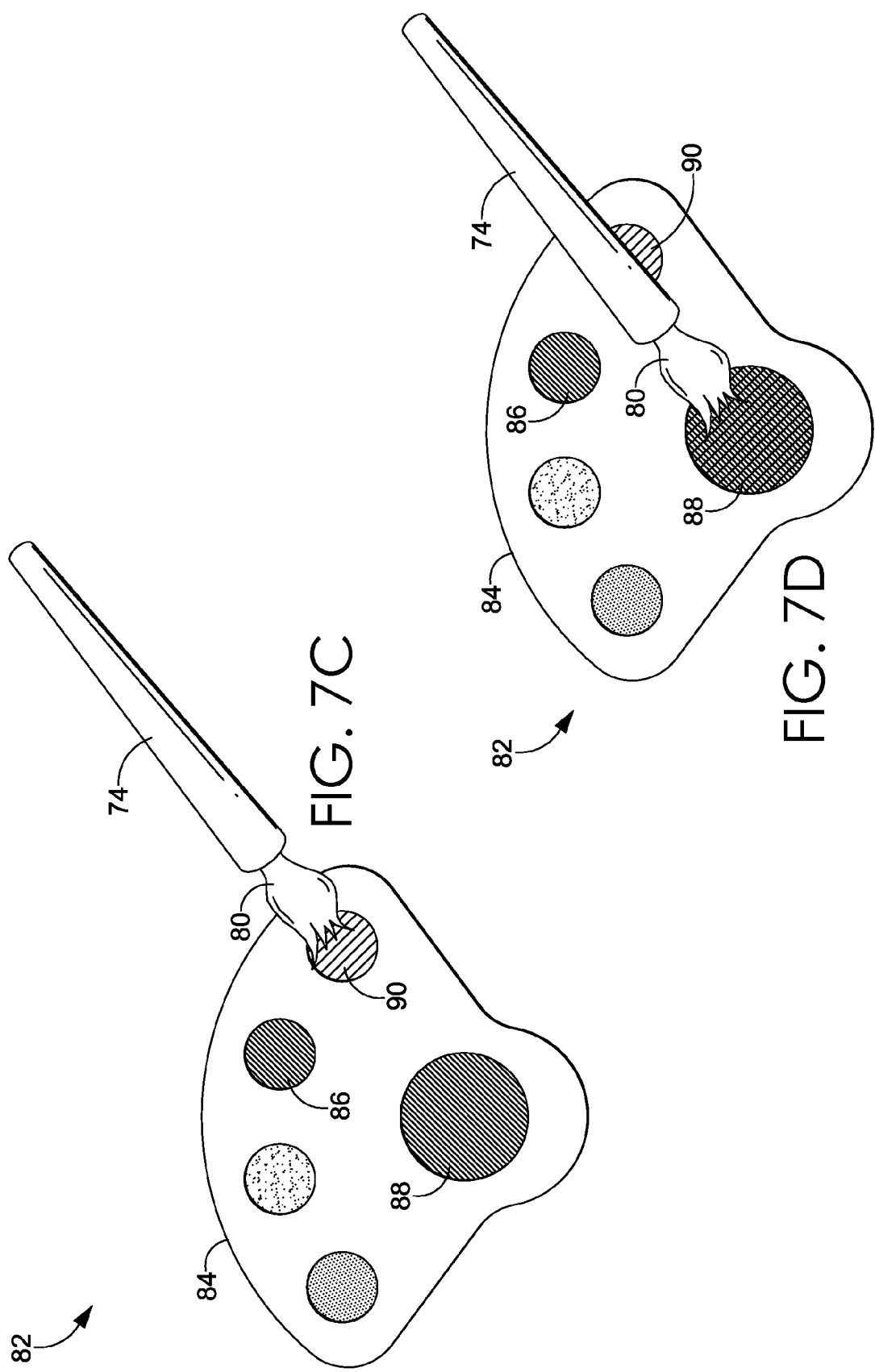

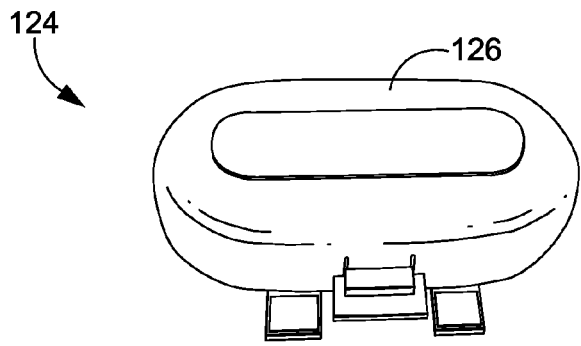
FIG. 14
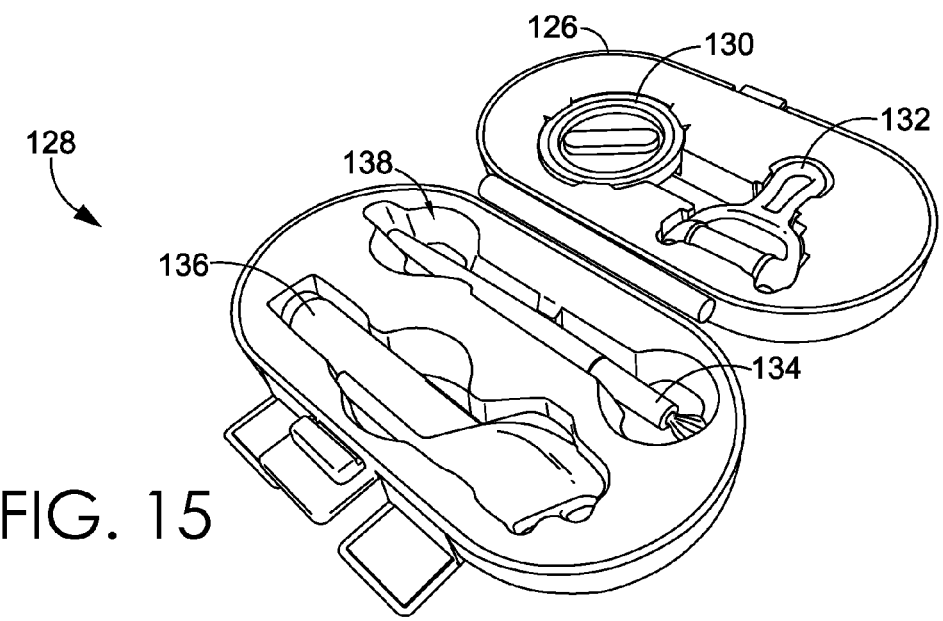
FIG. 15
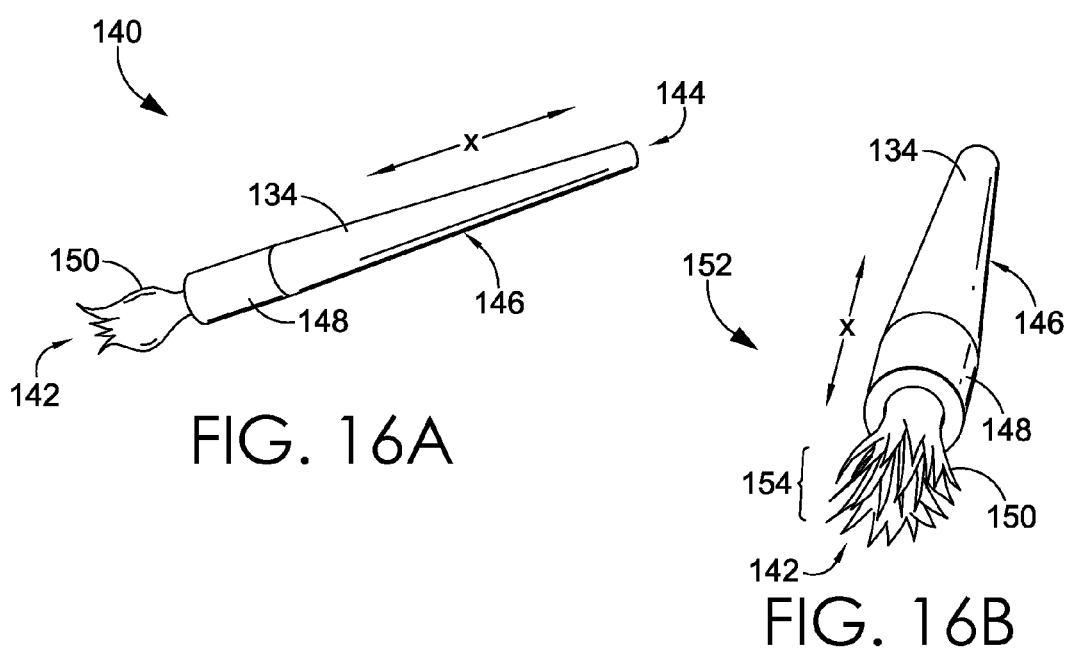
FIG. 16A
FIG. 16B

US 9,192,874 B2

DIGITAL COLORING TOOLS KIT WITH DYNAMIC DIGITAL PAINT PALETTE

CROSS-REFERENCE TO RELATED APPLICATIONS

This application claims priority to U.S. Provisional Application Ser. No. 61/788,371, filed Mar. 15, 2013, entitled "Digital Coloring Tools Kit With Panoramic View And Create-To-Destroy Interactive Features," and is related by subject matter to concurrently filed U.S. application Ser. No. 14/211,815, entitled "Panoramic Coloring Kit," the contents of both of which are hereby incorporated by reference in their entirety.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed Description section below. This summary is not intended to identify key features or essential features of the claimed subject matter, nor is it intended to be used as an aid in isolation to determine the scope of the claimed subject matter.

In brief and at a high level, this disclosure describes, among other things, a digital coloring tools kit for creating a realistic painting experience in a digital coloring environment for use with a touch-screen device. In further embodiments, the invention includes a panoramic coloring kit for coloring in a 360-degree digital coloring environment. In additional embodiments, the invention is directed to a create-to-destroy interactive kit for use with a touch-screen device.

DESCRIPTION OF THE DRAWINGS

Illustrative embodiments of the invention are described in detail below with reference to the attached drawing figures, and wherein:

FIG. 7A is a top view of a digital paint palette, in accordance with an embodiment of the invention;

FIG. 7B is a top view of a digital paint palette, in accordance with an embodiment of the invention;

FIG. 7C is a top view of a digital paint palette, in accordance with an embodiment of the invention;

FIG. 7D is a top view of a digital paint palette, in accordance with an embodiment of the invention;

FIG. 14 is a perspective view of a digital coloring tools kit case, in accordance with an embodiment of the invention;

FIG. 15 is a perspective view of the contents of the digital coloring tools kit of FIG. 14 in an open position, in accordance with an embodiment of the invention;

FIG. 16A is a perspective view of an exemplary digital paintbrush tool, in accordance with an embodiment of the invention;

FIG. 16B is an enlarged, perspective view of the tip of the digital paintbrush tool of FIG. 16A, in accordance with an embodiment of the invention;

DETAILED DESCRIPTION

Figure 1:
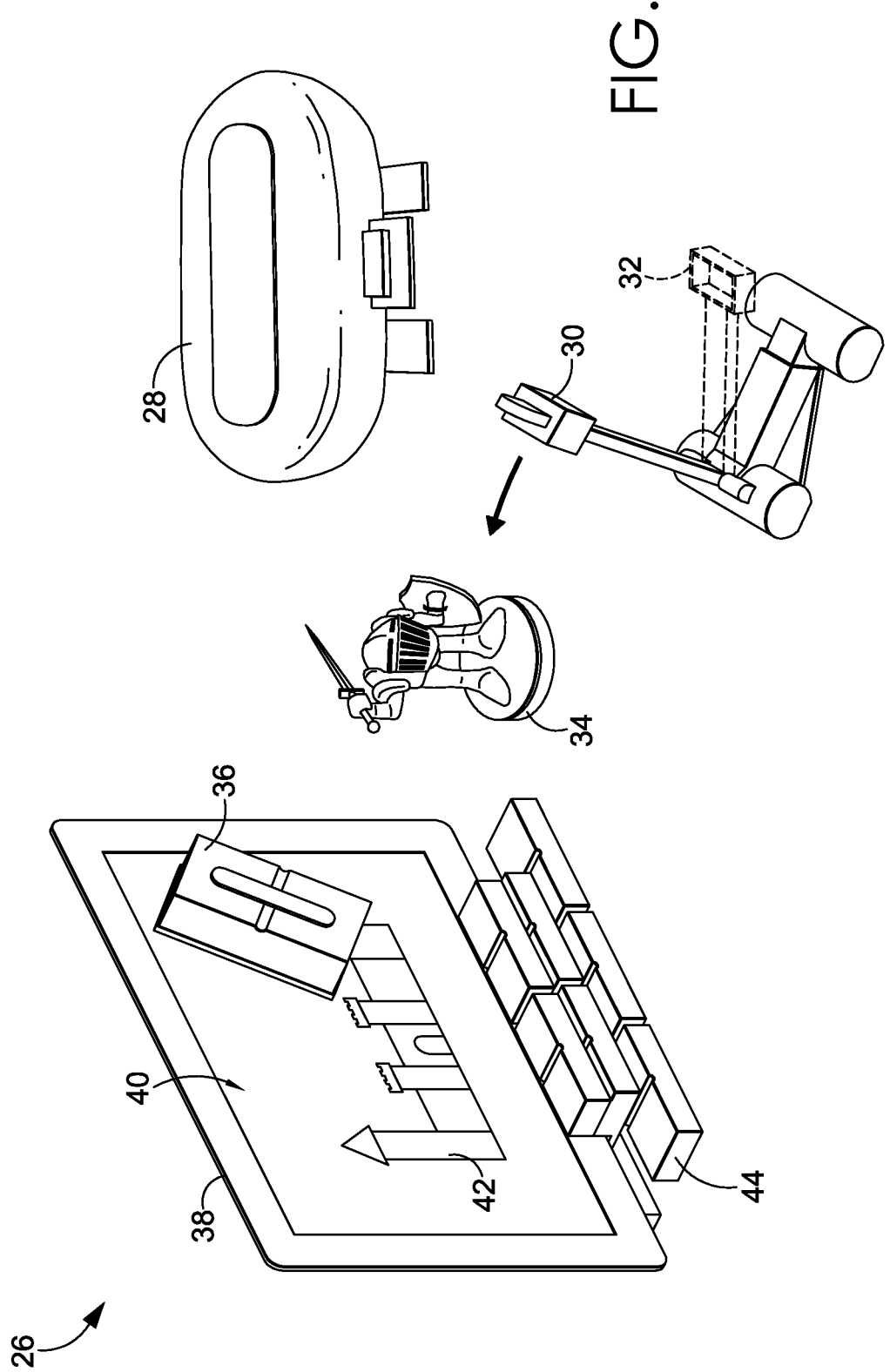
FIG. 1 is a perspective view of components of a create-to-destroy interactive kit for use with a touch-screen device, in accordance with an embodiment of the invention.

The subject matter of embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the invention include a digital coloring tools kit for creating a realistic painting experience for use with a touch-screen device. In further embodiments, the invention includes a panoramic coloring kit for coloring a 360-degree coloring environment. In additional embodiments, the invention is directed to a create-to-destroy interactive kit for use with a touch-screen device.

In one embodiment, the present invention is directed to a digital coloring tools kit. The digital coloring tools kit may include a digital paintbrush tool, a digital stamper, and a color mixing paint palette. The digital paintbrush tool, the digital stamper, and the color mixing paint palette are configured to interact with a touch-screen surface of a computing device.

Another embodiment of the invention is directed to a digital coloring tools kit, which may include an activation feature for a digital coloring tools kit application, a digital paintbrush tool, and a digital paint palette. The digital paintbrush tool and the digital paint palette may be configured to interact with a digital coloring environment presented on a touch-screen surface of a computing device executing the digital coloring tools kit application.

In yet another embodiment, the present invention is directed to a method of providing an interactive digital coloring tools environment. The method may include receiving an indication of a digital coloring tools application. The method may further include executing the digital coloring tools application by a computing device, wherein executing the digital coloring tools application comprises presenting, on a touch-screen display of the computing device, an interactive digital coloring environment. The interactive digital coloring environment may be dynamically generated in response to user inputs received by the touch-screen display and corresponding to at least a portion of the interactive digital coloring environment. Additionally, the user inputs received by the touch-screen display may correspond to at least one a digital paintbrush tool, a digital stamper, and a digital paint palette.

With reference now to the figures, apparatus, methods and systems for providing a digital coloring tools kit are described in accordance with embodiments of the invention. Various embodiments are described with respect to the figures in which like elements are depicted with like reference numerals.

Figure 13:
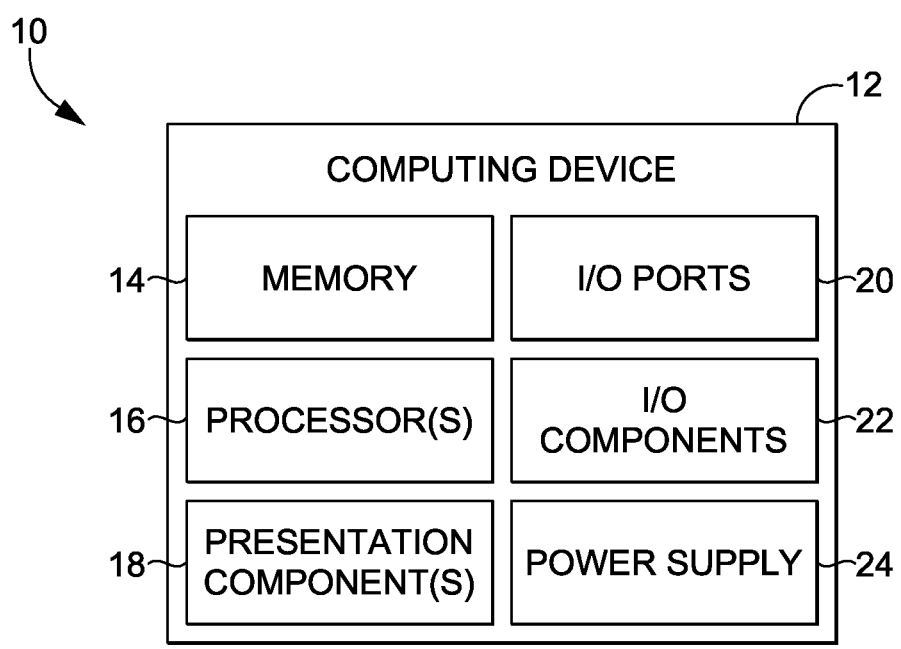
FIG. 13 is an exemplary computing system for executing an application in accordance with embodiments of the invention.

Referring initially to FIG. 13, an exemplary operating environment 10 in which embodiments of the present invention may be implemented is described below to provide a general context for various aspects of the present invention. Exemplary operating environment 10 includes a computing device 12, which is but one example of a computing environment for use with the present invention. The computing device 12 is not intended to suggest any limitation as to the scope of use or functionality of embodiments of the invention, and should not be interpreted as having any dependency or requirement relating to any one component nor any combination of components illustrated. As one skilled in the art would recognize, one or more of the components of operating environment 10 may be used to execute an application associated with embodiments of the invention.

Computing device 12 may include hand-held devices, consumer electronics, general-purpose computers, more specialty computing devices, touch-pad computing devices, touch-screen computing devices, and the like. Embodiments of the invention may be described in the general context of computer code or machine-useable instructions, including computer-useable or computer-executable instructions such as program modules, being executed by the computing device 12. The computing device 12 typically includes a variety of computer-readable media, which may be any available media that is accessible by the computing device 12, such as computer storage media that stores computer-executable instructions for executing by the computing device 12. In one embodiment, computing device 12 is a touch-screen device having a camera, such as an iPod Touch®, iPad®, and/or an iPhone® device provided by Apple® Inc.

As shown in the example of FIG. 13, the computing device 12 includes the following components: a memory 14, one or more processors 16, one or more presentation components 18, one or more input/output (I/O) ports 20, one or more I/O components 22, and an illustrative power supply 24. As will be understood, the components of exemplary computing device 12 may be used in connection with one or more embodiments of the invention. In embodiments, computing device 12 may include fewer components than those depicted in FIG. 13, or other components in addition to those depicted in FIG. 13. In one embodiment, the computing device 12 may execute an application to provide The memory 14 includes computer-storage media in the form of volatile and/or nonvolatile memory that may be removable, non-removable, or a combination thereof. The computing device 12 also includes one or more processors 16 that read data from various entities such as the memory 14 or the I/O components 22. The presentation component(s) 18 present data indications to a user or other device, such as a display device, speaker, printing component, vibrating component, and the like. The I/O ports 20 allow the computing device 12 to be logically coupled to other devices, while the I/O components 22 may include a microphone, joystick, game pad, satellite dish, scanner, printer, wireless device, and a controller, such as a stylus, a keyboard and a mouse, a natural user interface (NUI), and the like.

Turning now to FIG. 1, a create-to-destroy interactive kit 26 for use with a touch-screen device is described in accordance with an embodiment of the invention. As shown in FIG. 1, the interactive kit 26 may be a kit for use with a touch-screen device 38, which may include one or more components of the computing device 12 of FIG. 13. The kit may include a tool case 28, a digital catapult 30 moveable into a compressed position 32, a digital character stamp 34, and a digital stacker stamp 36. The kit may further include physical glyphs that may be attached to the digital catapult 30 for projection. In various embodiments of the interactive kit 26, a portion of the components depicted in FIG. 1 may be part of the interactive kit 26, while other components may be excluded from the kit. Tool case 28 provides a storage mechanism for one or more of the components of the interactive kit 26, such as the digital catapult 30, the digital character stamp 34, and the digital stacker stamp 36. In embodiments, the tool case 28 is a hard-shell storage case configured to couple to a computing device 12, such as a tool case 28 that clips onto a touch-screen device 38. Additionally, tool case 28 may further serve as a stand for a computing device 38 used in conjunction with the kit 26. For example, the exterior of the tool case may include a slot configured to receive a portion of the computing device 38. In further embodiments, the tool case 28 may be opened and spread flat on a playing surface, such as a table or a floor, such that when the slot configured to receive a portion of the computing device 38 actually receives such portion of the computing device 38, the tool case 28 provides a stable stand for the computing device 38. Based on an orientation of the computing device 38 when secured by the case/stand, a camera on the front surface of the computing device 38 may remain exposed to capture an image of the digital catapult 30 and/or glyph oriented in front of the computing device 38 and case/stand.

In embodiments, the digital catapult 30 is used to simulate the projection of objects towards a touch-screen device 38, such as a computing device 12, which may include an iPad®. The touch-screen device 38 includes a display surface 40 where images generated by the interactive kit 26 may be displayed. The constructed image 42 may include elements generated using the components of the interactive kit 26. Accordingly, in some embodiments, a constructed image 42 includes a structure for a user to build and then disassemble. In embodiments, an application associated with the interactive kit 26 is executed by the touch-screen device 38 to display a constructed image 42 based on user interaction. Accordingly, the digital stacker stamp 36 may be used to add structure to the constructed image 42, such as adding bricks to a castle image based on contacting the digital stacker stamp 36 with at least a portion of the display surface 40.

Having generated a constructed image 42 by contacting the digital stacker stamp 36 to the display surface 40 and/or displaying a pre-defined constructed image 42 provided by the application executed by touch-screen device 38, a user may then "destroy" the constructed image 42. In embodiments, the user may aim the digital catapult 30 at the display surface 40, and upon retracting and releasing from the compressed position 32, altering at least a portion of the constructed image 42. For example, a digital catapult 30 may be aimed and released with respect to the display surface 40. The touch-screen device 38 may receive an indication that the digital catapult 30 was aimed and released, and generate a corresponding response for an image depicted on the display surface 40. For example, the digital catapult 30 may be used to simulate the throwing of bricks at a building, and the destruction of such building upon the detection of contact. In embodiments, a camera associated with the touch-screen device 38, such as a camera on a computing device 12, may detect the position and/or location of the digital catapult 30. In detecting the position and/or location of the digital catapult 30, the application may respond according to actions by the digital catapult 30, such as responding to the simulated "throwing" of items at the display surface 40.

During attack by the digital catapult 30, one or more physical glyphs attached to the digital catapult 30 may be used to indicate the catapult's location to the touch-screen device 38. As such, the identity of a physical glyph attached to the arm of the digital catapult 30 may be identified during an attack, and a user may attach different physical glyphs to the digital catapult 30 for projection. In this way, the glyphs may be used to indicate the aiming and distance of the digital catapult 30 with respect to the touch screen device 38. In some embodiments, in determining the angle and distance of the digital catapult 30 from the touch-screen device 38, two small tag labels may be coupled to the front of the digital catapult 30 at a determined distance from each other. In embodiments, when the digital catapult 30 is placed in front of the camera of a touch-screen device 38, the application/software associated with the interactive kit 26 assigns a size for each of the tags. The interactive kit 26 then determines the angle of each of these tags with respect to the display surface 40, based at least in part on the proportion of each of the tags to each other. In further embodiments, the size proportion of the largest tag can also be used to determine the distance of the catapult from the touch-screen device 38, such as a distance from an iPad®. In one embodiment, LED lights on the digital catapult 30 may be used to determine user interactions using a camera of the computing device 12.

In further embodiments of the invention, the impact of an attack with the digital catapult 30 may depend upon the power applied by the digital catapult 30. In one embodiment, a mechanical clicker mechanism may be built into the digital catapult 30. For example, when the digital catapult 30 is pulled back to simulate the launch of a projectile, the amount of clicks that it takes to reach a final position (i.e. the amount of clicks to reach a compressed position 32) may indicate how far the digital catapult 30 will launch its "payload." In some embodiments, the application/software will compare the amount of clicks to the distance from the computing device 12 based on the use of the tags discussed above to see if the user under-shot the target, hit the target, or over-shot the target.

In another embodiment of the invention, a tag may be placed at the bottom of the digital catapult 30 arm, and a tag may be placed at an area where the "payload" would be placed (i.e., the simulated object being launched by the digital catapult 30). The application/software could then determine, for example, the amount of time that it takes from the time the tag at the bottom of the arm is not seen to the time the tag located near the payload is seen, to determine the amount of power generated by the throw. As such, the capture rate of the touch-screen camera may also be determined.

In some embodiments, the interactive kit 26 includes a device stand 44 for supporting the touch-screen device 38. As mentioned, the tool case 28 may be configured for use as a stand. In further embodiments, the digital character stamp 34 may be used to add animated images to the scene depicted on display surface 40. Accordingly, in some embodiments, the digital character stamp 34 may be recognized by the application executed on touch-screen device 38 based on contact of at least a portion of the digital character stamp 34 with the display surface 40. For example, based on contacting the touch-screen device 38 with the digital character stamp 34, an animated image may be added to the image including the constructed image 42, such as a fire-breathing dragon character being displayed based on contact of the digital character stamp 34 with a portion of the display surface 40.

In further embodiments, additional enhancements may be provided by the application executed by the touch-screen device 38 as part of the interactive kit 26. In one example, sound enhancements may be generated in response to a user's interaction with the application, such as an explosion sound being generated in response to a user projecting a virtual item with the digital catapult 30 towards the display surface 40 (i.e., "throwing" a simulated brick at the constructed image 42). In another embodiment, motion sensors of the touch-screen device 38 may detect motion of the device such as shaking or raising/lowering of the device with respect to a surface, and display a corresponding response. For example, a user may shake the touch-screen device 38 to simulate an earthquake, which may cause one or more images on the display surface 40 to be altered (e.g., a building collapsing, or one or more bricks stamped with the digital stacker stamp 36 shifting position).

In embodiments of the invention, the digital stacker stamp 36 may be used to create buildings on the touch-screen device 38, such as a castle, fortress, or other desired structure. The digital stacker stamp 36 may also be used to assemble blocks and/or add doors and windows to a simulated structure presented on the display surface 40. In embodiments, the application may be used to simulate a gaming environment that tests the strength of a structure assembled using the digital stacker stamp 36. For example, a user may "build" a virtual castle with individual bricks imprinted using the digital stacker stamp 36, and then test the strength of their creation by launching virtual boulders at the touch-screen device 38 using digital catapult 30. In some embodiments, with the digital character stamp 34, a user may add additional enhancements to a scene displayed on display surface 40, such as adding a stationary or animated figure that interacts with the constructed image 42.

In some embodiments, the create-to-destroy interactive kit 26 may be used in conjunction with multiple touch-screen devices. As such, a user may interact with another user executing the same application and/or a different instance of the same application to compete in the simulated environment of the interactive kit 26. Thus, a first user may create a constructed image 42 that is destroyed by a second user, and vice versa. In one embodiment, a user may save, email, print, or otherwise store a constructed image 42 that the user assembles, based at least in part on the addition of one or more "bricks" using the digital stacker stamp 36.

Embodiments of the interactive kit 26 include an application that provides a first tier of options available to a user upon purchase of the interactive kit 26, and a second tier of options available to the user upon "unlocking" a full mode of the interactive kit 26. In one example, a user may purchase the interactive kit 26 with an application that enables the user to access a "try me" mode of the product, and utilize a limited number of building materials, backgrounds, attack modes, etc. In another example, the user may "unlock" a full mode of the purchased interactive kit 26 to activate additional options with the digital stacker stamp 36, the digital character stamp 34, the digital catapult 30, and other features of the interactive kit 26 that may be limited and/or restricted based on which mode a user is executing.

In one embodiment of the invention, the interactive kit 26 generates a menu screen for presentation on the display surface 40. The menu screen may include multiple components for selection by a user, including a "start creating" indicator, a "start destroying" indicator, a "gallery" indicator, an "options" indicator, and a "more from Crayola indicator." The "start creating" indicator may be selected to begin constructing a building, such as the constructed image 42. In embodiments, the selection of the "start creating" indicator presents a user with a selection screen to initiate a variety of beginning options, such as selecting a premade castle/building that the user may build upon and/or customize using a building tool. In another example, the selection screen provides a number of backgrounds or landscapes, such as three-dimensional backgrounds, for a user to view behind their constructed image 42.

In further embodiments of the "start creating" mode, the user may begin building a three-dimensional figure using bricks, gates, towers, walls, and the like. In some embodiments, a user selects an object to build with, and selects what material the object will be made out of. For example, a user may select from a menu of building materials, such as wood, stone, glass, brick, and/or mud. In embodiments of the invention, different building materials may react differently (i.e., produce a different result displayed to a user) to different "attacks" from a user (i.e., to destruction by a catapult, or other user intervention).

In some embodiments, the interactive kit 26 includes multiple create modes for a user to create a constructed image 42. In one embodiment, an open create mode includes features that allow a user to select a type of object, with the number of objects available to the user only being limited to the size of the work area. In another embodiment, a challenge mode includes features that allow the application to determine a type and number of objects for use. For example, in the challenge mode, individual objects may be presented one at a time for the user to place in the work area (i.e., for the user to manipulate on display surface 40). In one example, the challenge mode requires a user to create a different structure each time, with a limited number of objects.

The "start destroying" indicator may be selected to direct the user to a pre-constructed image 42 for destruction by the user. In one example, the "start destroying" indicator may be selected to navigate the user to a gallery where the user can select a pre-made castle (provided by the application) or a saved design previously created and stored by the user. In embodiments of the invention, a user may "destroy" the constructed image 42 using manual manipulation of the touch-screen device 38, such as touching the display surface 40 with a finger, or virtual manipulation, such as projecting a catapult towards the screen. In embodiments, the user may attack in a "destroy" mode of the invention using different types of destruction techniques, such as a fireball, cannonball, ground shaker, lightning bolt, dinosaur, cow, etc. In one embodiment, tapping a surface of the touch-screen device 38 launches an attack as if it was coming from the digital catapult 30. Each attack by a user may affect each material differently, based on the type of attack and the type of material being affected. For example, a fireball that contacts wood may light the wood on fire but may have little effect on stone. In another example, a canon ball may put a hole in a wooden structure, but may crumble stone. In one embodiment, objects such as walls and towers are reduced to bricks when hit with an attack.

In embodiments of the invention, a dinosaur attack mode may be executed by the user to cause one or more changes to the constructed image 42. For example, a user can select to attack a castle with a dinosaur character, or may simulate launching a dinosaur character onto a scene by "virtually" propelling it using the digital catapult 30. In embodiments, a dinosaur character may damage a constructed image 42 through movement of the dinosaur character's body, such as slashing of the dinosaur character's tail that knocks down bricks. In one embodiment, an "attack" by a dinosaur character may be initiated by a user, while in another embodiment, the application may initiate a dinosaur attack on the constructed image 42. In further embodiments, a dinosaur attack may last for a predetermined amount of time, such as a particular number of seconds. After the predetermined amount of time has passed, the digital image of the dinosaur character may be removed from view on the display surface 40, such as by running away.

In embodiments of the invention utilizing a game-playing mode, a variety of features and/or simulations may be generated by the application to enhance the user experience of interacting with the interactive kit 26. In embodiments, an amount of destruction of a constructed image 42 may be measured in points, with a number of points being assigned, for example, to the number of bricks knocked down by a user per attack. For example, in one attack, one brick knocked down by a user may generate one point, while in another attack that knocks down ten bricks, ten points may be generated. In one embodiment, a goal of the game may be to accumulate as many points as possible with the fewest number of attacks. Accordingly, in another embodiment, multiple players accessing the application may be allowed to take turns building and destroying each others' castles.

Selection of the "gallery" indicator may provide a view of multiple scenes previously interacted with and saved by the user, including images of buildings constructed and/or destroyed using the digital stacker stamp 36, the digital character stamp 34, and the digital catapult 30. The "options" indicator may be selected to generate a menu of additional options for execution for a user, while the "More from Crayola" indicator may be selected to navigate a user to additional enhancements that may be accessed and/or purchased for use with the interactive kit 26.

In some embodiments, as part of the digital application provided with the interactive kit 26, a user may be able to purchase additional digital enhancements for the application (i.e., "in-app purchases") that further enhance the user's experience, such as updating the interactive kit 26 with additional pre-built castles/buildings, adding additional building materials, adding additional attack modes, etc. In further embodiments of the invention, the application is adapted to build structures (buildings, castles, etc.) in both a two-dimensional and a three-dimensional mode for presentation to a user.

As mentioned, in embodiments, the present invention is directed to a digital coloring tools kit for providing an interactive coloring experience in a digital coloring environment. The digital coloring tools kit may include, for example, a digital paintbrush tool, a digital stamper, and a digital color mixing paint palette. The digital coloring tools kit may further include a digital coloring tool application that is configured to generate the digital coloring environment. These exemplary kit components will be discussed in greater detail below.

Figure 2:
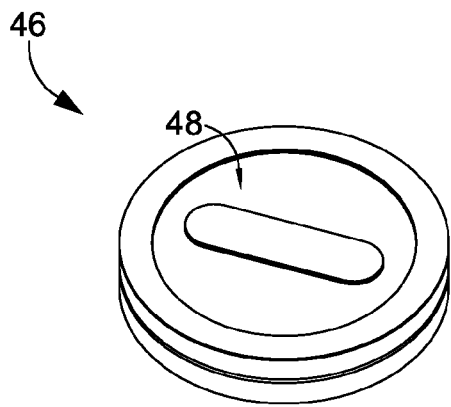
FIG. 2 is a top perspective view of a digital stamping tool, in accordance with an embodiment of the invention.
Figure 3:
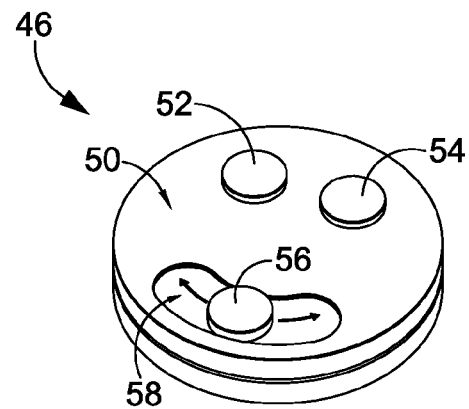
FIG. 3 is a bottom perspective view of the digital stamping tool of FIG. 2, in accordance with an embodiment of the invention.

Specifically, with reference to FIGS. 2-3, embodiments of a digital coloring tools kit may include a digital stamper 46 that is used to add enhancements to an image displayed on a computing device, such as the computing device 12 of FIG. 13, which may include a touch-screen device, based on contacting a touch-screen surface of a computing device, such as the computing device 12 of FIG. 13. The digital stamper 46 has a top surface 48 and a bottom surface 50. When the bottom surface 50 contacts the touch-screen of the computing device 12, one or more touch-points contact the surface, such as stationary touch-points 52 and 54, and translating touch-point 56 that travels inside a defined space 58. To determine which enhancements to generate based on contact with the digital stamper 46, an application associated with the digital coloring tools kit is configured to identify a particular orientation of the translating touch-point 56 relative to the two other stationary touch-points 52 and 54. In further embodiments of the invention, digital stamper 46 includes two touch-points detectable by a touch-screen device. Additional embodiments of a digital stamper will be discussed with respect to FIGS. 18A-18B.

Figure 4:
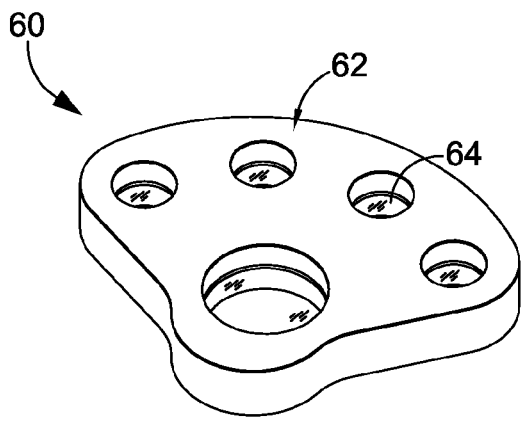
FIG. 4 is a top perspective view of a digital paint palette 60, in accordance with an embodiment of the invention.
Figure 5:
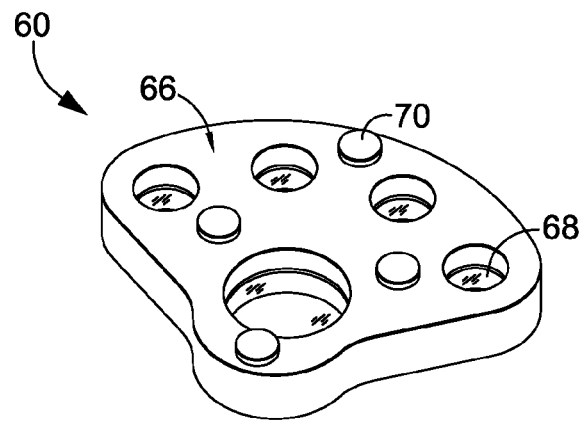
FIG. 5 is a bottom perspective view of the digital paint palette of FIG. 5, in accordance with an embodiment of the invention.
Figure 26:
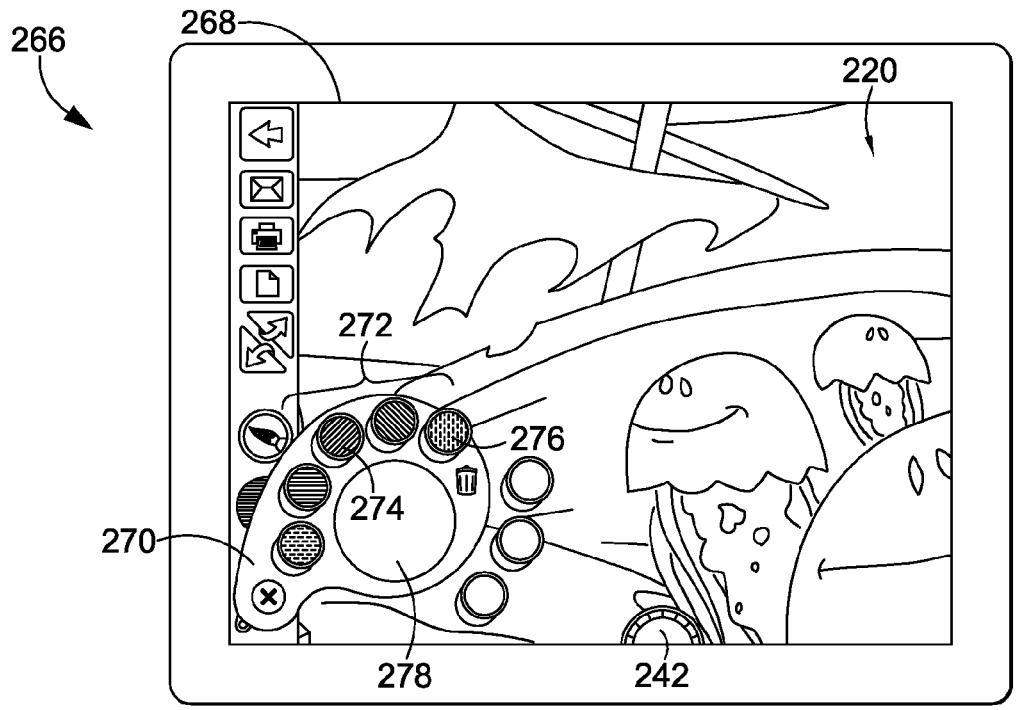
FIG. 26 is an exemplary digital coloring environment generated by a digital coloring tool application, with a dynamic digital paint palette selected, in accordance with an embodiment of the invention.
Figure 27:
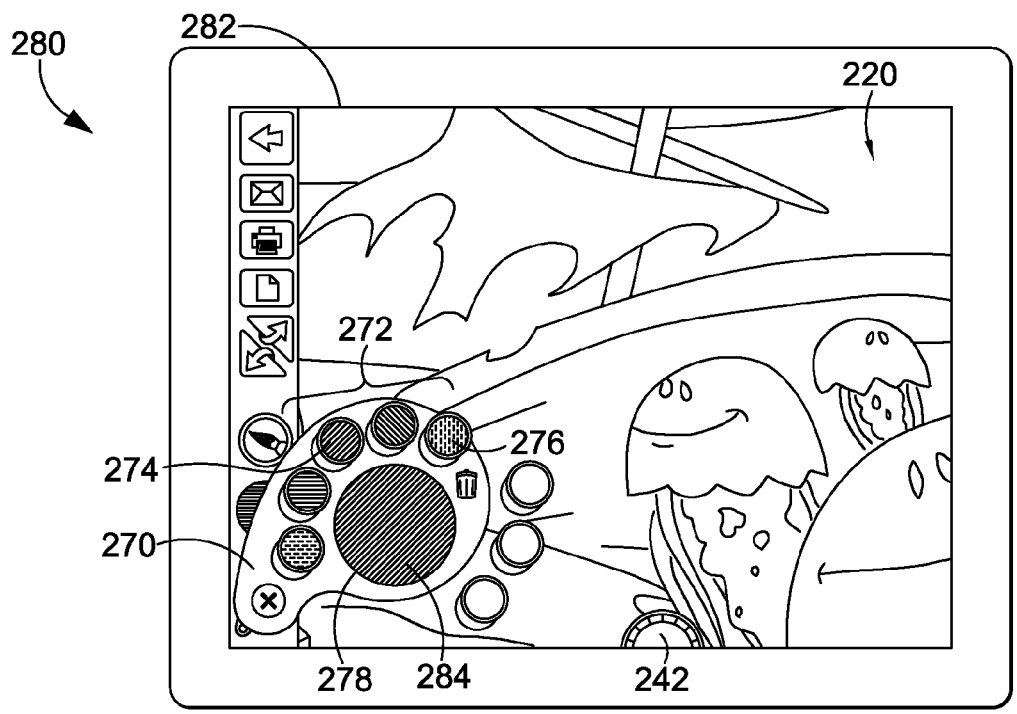
FIG. 27. is an exemplary digital coloring environment generated by a digital coloring tool application, with a first color selected in a mixing tray of the dynamic digital paint palette of FIG. 26, in accordance with an embodiment of the invention.
Figure 28:
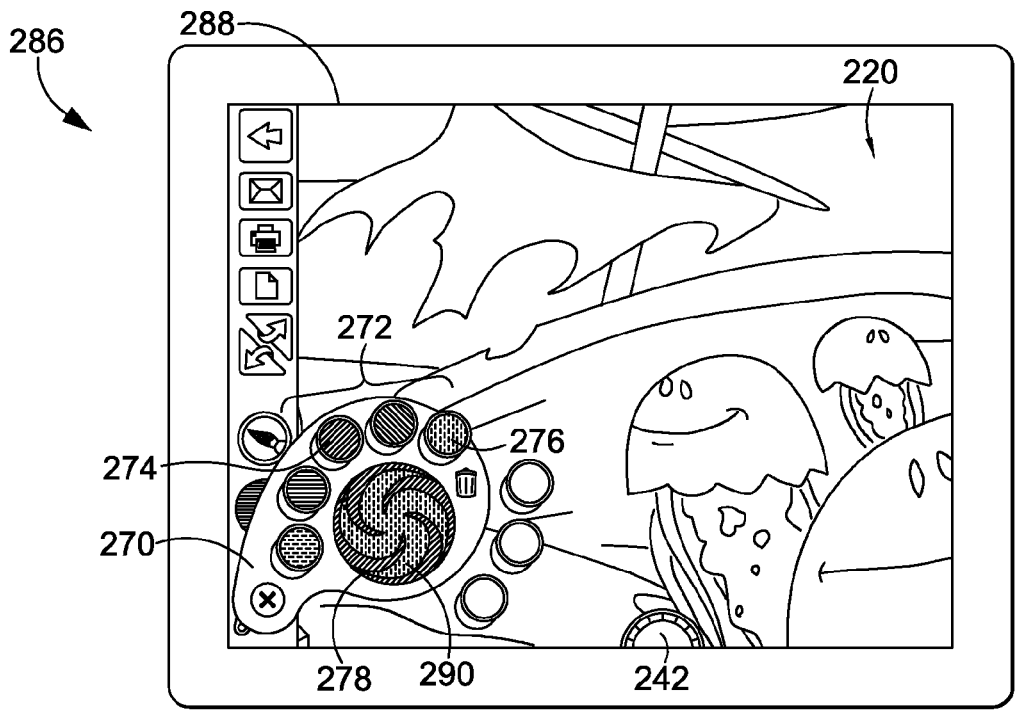
FIG. 28 is an exemplary digital coloring environment generated by a digital coloring tools application, with a first and a second color selected in a mixing tray of the dynamic digital paint palette of FIG. 27, in accordance with an embodiment of the invention.
Figure 29:
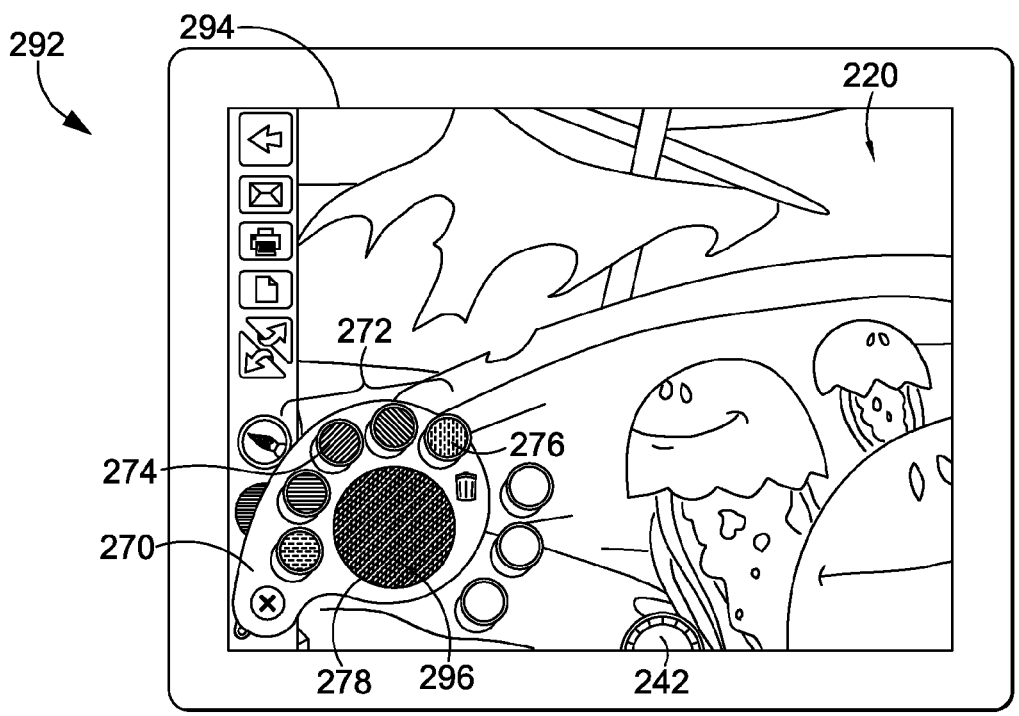
FIG. 29 is an exemplary digital coloring environment generated by a digital coloring tools application, with a first and second color combined in the mixing tray of the dynamic digital paint palette of FIG. 28, in accordance with an embodiment of the invention.

As shown in FIGS. 4-5, embodiments of the digital coloring tools kit include a digital paint palette 60 having a top surface 62, a plurality of transparent openings 64, a bottom surface 66, and a plurality of digital touch-points 70. The plurality of transparent openings 64 may be viewed from the bottom surface 66 as a plurality of transparent openings 68. The plurality of digital touch-points 70 may be oriented in a particular configuration on the bottom surface 66 such that the identity of the digital paint palette 60 may be recognized by a touch-screen device, such as an iPad® computing device. In embodiments, the digital coloring tools kit includes a virtual digital paint palette, such as the virtual digital paint palette 270 of FIG. 26. In such embodiments, the virtual digital paint palette may be presented on a touch-screen display as part of the digital coloring environment, such as on a user interface within the digital coloring environment.

Figure 6:
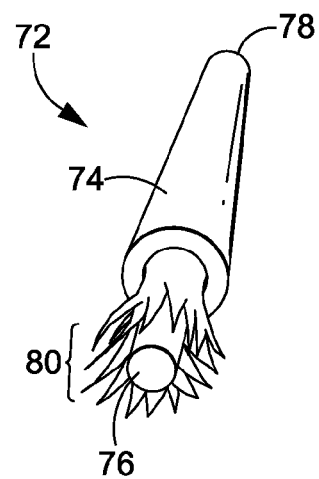
FIG. 6 is a perspective view of a single touch-point brush, in accordance with an embodiment of the invention.

Embodiments of the digital coloring tools kit provide "realistic" painting effects like color mixing, using intuitive painting tools designed specifically for a touch-screen device, such as the single touch-point brush 72 in FIG. 6. Other embodiments of a digital paintbrush are discussed with respect to FIGS. 16A-16B. The exemplary single touch-point brush 72 has a body 74, with a single touch-point 76 at a proximal first end of the single touch-point brush 72, a distal second end 78 of the single touch-point brush 72, and a plurality of paintbrush bristles 80 surrounding the single touch-point 76. The single touch-point 76 and/or paintbrush bristles 80 may be detected by a touch-screen surface on a computing device 12. The single touch-point brush 72 may or may not include the paintbrush bristles 80 surrounding the single touch-point 76. In embodiments, the single touch-point brush includes a plurality of conductive touch-points concentrated in a single, localized area, such as conductive paintbrush bristles. In other words, the single touch-point is not limited to one conductive point, but can include a number of conductive points that are concentrated in one area.

Embodiments of the invention provide realistic painting effects for coloring on a touch-screen device. For example, a kit may provide realistic paint effects such as color mixing and swirling, color bleeding, color slowly decreasing in intensity (lightening) as a brush stroke "runs out" of paint, and additional subtle painting effects for individual types of paint. Accordingly, a painting effect for a corresponding type of paint may include providing a slightly embossed appearance for a child's paint. In another example, a painting effect for a particular type of paint may include added transparency and/or darker-colored edge appearance for a watercolor paint. In embodiments of the invention, painted designs created by a user may be altered using erasable features and undo features. In further embodiments, color-mixing features are provided where, in the image displayed on the computing device screen, a color stays bright rather than muddy during color mixing. Additionally, embodiments of the invention provide for various lay-down effects, such as brush width, patterns, and glitter/metallic features of the ink being digitally painted with on the touch-screen device. In one embodiment, the digital coloring tools kit provides an interactive user interface, upon executing an application of the kit, with realistic-looking paint mixing, blending, and swirling features, as well as robust but simple to use color mixing features, when interacted with by a variety of digital coloring tools. In some embodiments, digital creations generated by a user with the kit may be saved to a memory for sharing or future enhancing.

In embodiments, placing a paint palette, such as the digital paint palette 84 of FIG. 7A, on the touch-screen of a computing device, such as an iPad® device, brings up a palette of colors underneath the digital paint palette device. In one embodiment, primary mixing colors appear through the transparent openings on the paint palette, while the larger opening on the paint palette remains empty for color mixing. In embodiments, a user can "pick up" a color and add it to the mixing area. Once two or more colors have been added, the user can mix the selected colors with the digital paintbrush to swirl colors and thoroughly mix the selected colors. In embodiments, an amount of color added to the mixing area is determined based on an amount of times a user taps a particular paint palette opening. In one example, colors are mixed in a one-to-one ratio unless the user adds more taps of a color than another. As mentioned, the digital coloring tools kit may also include a virtual digital paint palette. In this instance, a user may select a virtual digital paint palette indicator, and in response to such selection, a virtual digital paint palette may be presented on the touch-screen of the computing device. A user may then interact with the virtual digital paint palette in ways analogous to those described above with respect to the digital paint palette 84.

For example, as shown in FIGS. 7A and 7B, an activated paint palette 82 displays multiple coloring options inside a plurality of transparent openings 86 on a digital paint palette 84. As such, the paintbrush bristles 80 (and/or single touch-point 76) on the body 74 may interact with the transparent openings 86 to indicate a selection by a user of a particular color being displayed in a particular opening. Accordingly, FIG. 7A depicts an embodiment of the invention including an activated paint palette 82 that displays colors on a surface of a touch-screen device through the individual, transparent openings, such as transparent openings 86, on the digital paint palette 84. Having selected the color of paint displayed through transparent opening 86 with the single touch-point brush 72, the user may then add that color to the mixing area 88, as shown in FIG. 7B. The user may then paint an image on the touch-screen surface using the selected color, or may continue to mix an additional color. As such, as in FIG. 7C, the user may select a second color from a transparent opening 90 to mix with the color from transparent opening 86. As shown in FIG. 7D, the user may thereby create a blended paint in the mixing area 88 that includes both colors. Again, in embodiments, the features and/or functions provided by the digital paint palette 84 and/or the activated paint palette 82 may, alternatively or additionally, be provided by a virtual digital paint palette.

Accordingly, in embodiments of the invention, the colors being presented through the openings in the activated paint palette 82 are those that are presented on the touch-screen based on the touch-screen recognizing the location/identity of the digital paint palette 84 using digital touch-points, such as the digital touch-points 70 of FIG. 5. Further, upon providing one or more colors for selection in the transparent openings, such as transparent opening 86, the touch-screen may then receive an indication of a color selection of at least one of the colors populated in each opening by the touch-screen. The selected color(s) may then be used to draw in a virtual environment of the digital coloring tools kit, such as on a watercolor background. In one embodiment, two selected colors are mixed in the mixing area 88 and then used to color in a virtual environment on the touch-screen display. Again, the features and/or functions provided by the activated paint palette 82 may also be provided by a virtual digital paint palette.

Figure 8:
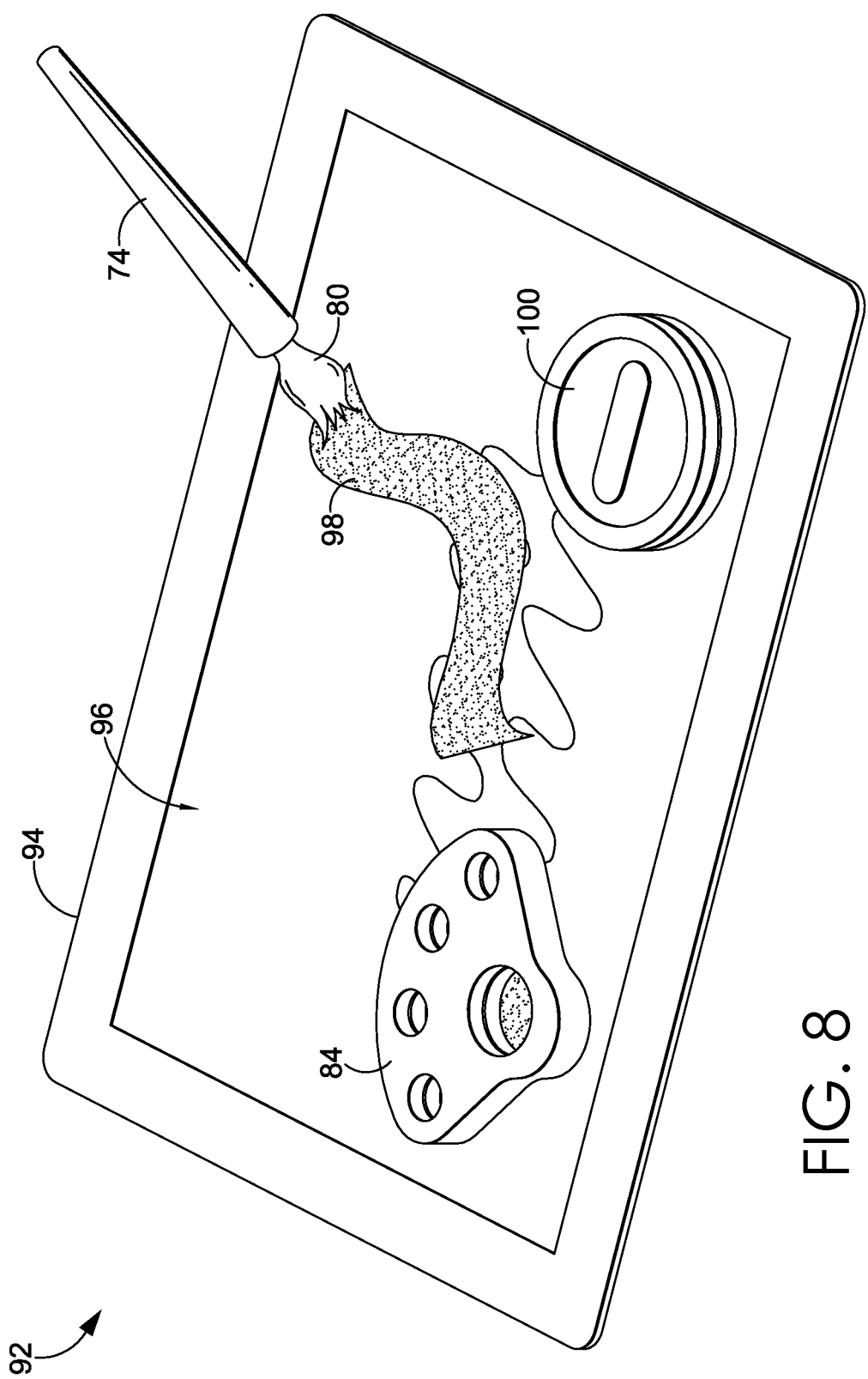
FIG. 8 is perspective view of a digital coloring tools kit, in accordance with an embodiment of the invention.

As shown in FIG. 8, an exemplary digital coloring tools kit 92 includes a digital stamper 100 and a digital paint palette 84 that are used to add enhancements to the painting created by the paintbrush bristles 80 of the digital paintbrush. In one embodiment, a mixture of paint selected by the user creates a mixed paint stroke 98 on the display surface 96 of the touch-screen device 94.

In a further embodiment of the invention, an exemplary digital coloring tools kit 124 may include a carrying case 126, as shown in the perspective view of FIG. 14, which encloses one or more digital coloring tools. As shown in the exemplary embodiment of FIG. 15, a digital coloring tools kit 128 may include a carrying case 126 that secures a variety of digital coloring tools within one or more cavities 138 of the carrying case 126, such as a digital stamper tool 130, a digital pattern roller 132, a digital paintbrush tool 134, and a digital airbrush tool 136. In further embodiments of the invention, the digital coloring tools kit 128 may include fewer or greater digital coloring tools than those depicted in FIG. 15, such as additional and/or alternative tools configured to interact with a touch-screen surface of a computing device. In embodiments, the digital stamper tool 130, digital pattern roller 132, digital paintbrush tool 134, and digital airbrush tool 136 are configured to interact with a digital coloring tools kit application executed by a touch-screen computing device, such as the computing device 12 of FIG. 13.

In addition to the single touch-point brush 72 of FIG. 6, FIG. 16A shows an additional embodiment of a digital paintbrush that may be provided in the digital coloring tools kit. The perspective view 140 includes a digital paintbrush tool 134, having a first end 142 and a second end 144 oriented along a longitudinal x-axis, is depicted according to one embodiment of the invention. In embodiments, a digital paintbrush tool 134 may include a base 146 coupled to a grip 148, which is coupled to a bristle tip 150.

FIG. 16B provides an enlarged view 152 of the digital paintbrush tool 134. As shown, the bristle tip 150 may include a plurality of contacting conductive bristles 154 that are configured to interact with a touch-screen display of a computing device. For example, the touch-screen of a computing device may be configured to recognize a contact between the touch-screen and the plurality of contacting conductive bristles 154, such that the digital paintbrush tool 134 may be used to interact with the digital coloring environment presented on the touch-screen.

In some instances, the plurality of contacting conductive bristles 154 may be activated only when a user holds the grip 148 of the digital paintbrush tool 134. In other words, the plurality of contacting conductive bristles 154 may be configured such that the touch-screen display of a computing device will detect contact by the plurality of contacting conductive bristles 154 only when the user holds the digital photo cutter 31 in a certain way. Such a configuration may require a user to properly grip the digital paintbrush tool 134 in order to use it within the digital coloring environment. Thus, a user may be encouraged to learn to grip writing utensils, generally, in a proper manner.

Figure 17:
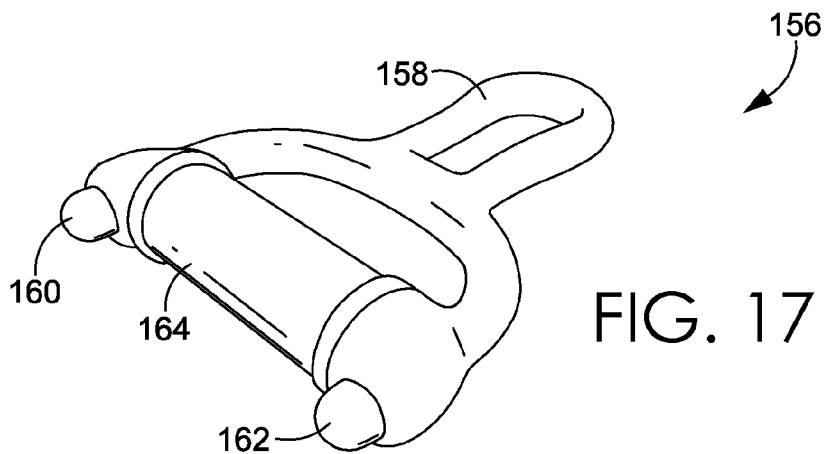
FIG. 17 is a perspective view of a digital pattern roller, in accordance with an embodiment of the invention.

Turning now to FIG. 17, an exemplary digital pattern roller 156 is illustrated. In embodiments, the digital pattern roller 156 is used to simulate the effect of rolling a pattern across the screen. Various aspects of creating such a rolling pattern effects are discussed in greater detail with respect to FIGS. 30-31. The digital pattern roller 156 may include a roller handle 158, a first touch-point 160, a second touch-point 162, and roller body 164. As will be understood, the touch-points 160 and 162 may be configured to be detected by a computing device having a touch-screen display when the touch-points 160 and 162 come into contact with the touch-screen display. In embodiments, the touch-points 160 and 162 of the digital pattern roller 156 contact the touch-screen display, and the digital pattern roller is then dragged across the touch-screen display, such that the touch-points 160 and 162 remain in contact with the touch-screen display as they are dragged across the touch-screen display, to produce one or more rolling pattern effects. As such, in some embodiments, the digital pattern roller 156 is configured to interact with a touch-screen display upon contact of both of the touch-points 160 and 162, and such contact of both touch-points with the touch-screen display may be required before the corresponding rolling pattern effects will be generated in the digital coloring environment. For example, if only touch-point 160 contacts the touch-screen, the rolling pattern enhancement might not be added to the digital coloring environment.

Figure 18A:
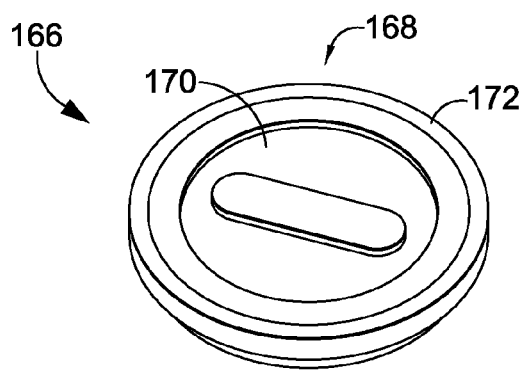
FIG. 18A is a top, perspective view of a digital stamper tool, in accordance with an embodiment of the invention.
Figure 18B:
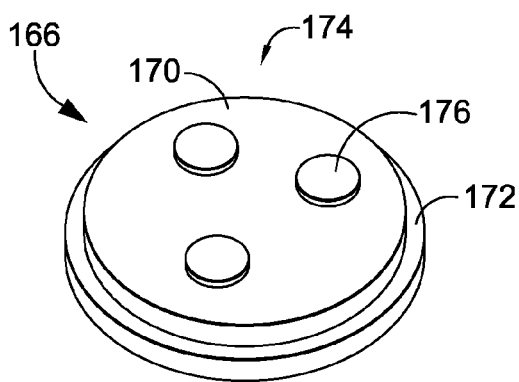
FIG. 18B is a bottom, perspective view of the digital stamper tool of FIG. 18A, in accordance with an embodiment of the invention.

Turning now to FIGS. 18A-18B, a digital stamper tool 166 is depicted, in accordance with embodiments of the present invention. In embodiments, the digital stamper 166 provides features and/or functions similar to those discussed with respect to the digital stamper 46 of FIGS. 2-3. Generally, as will be discussed in more detail with respect to FIGS. 32-33, the digital stamper tool 166 may be used to add additional items, features, animated effects, and other enhancements to a digital coloring environment based on contacting a touch-screen display of a computing device with the digital stamper tool 166. The exemplary digital stamper tool 166 includes a stamp base 170, which has a top surface 168 and a bottom surface 174. When the bottom surface 174 is placed on the touch-screen of a computing device, one or more touch-points, such as touch-point 176, may contact the surface of a touch-screen display. As will be understood, the touch-point 176 may be configured to be detected by a computing device having a touch-screen display when the touch-point 176 comes into contact with the touch-screen display. Additionally, the digital stamper tool 166 may include a grip 172. In some embodiments, the grip 172 is a conductive grip. Thus, the digital stamper tool 166 may be configured such that a touch-screen display of a computing device will detect contact between the digital stamper tool 166 and the touch-screen display only when a user holds the conductive grip 172 and all touch-points, including touch-point 176, are in contact with the touch-screen of the computing device.

Figure 19:
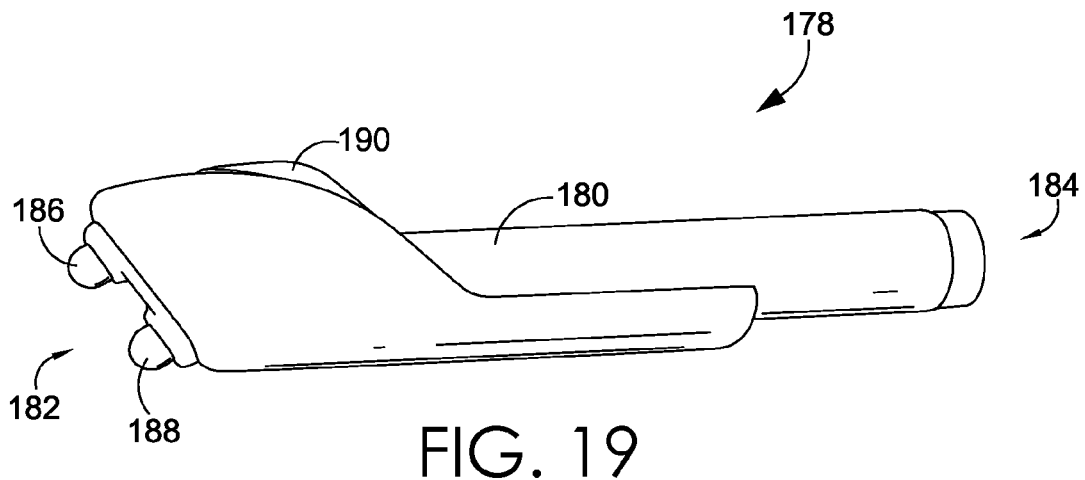
FIG. 19 is a perspective view of a digital airbrush tool, in accordance with an embodiment of the invention.

FIG. 19 illustrates a digital airbrush tool 178, which may be used to create an airbrush effect in a digital coloring environment, in accordance with embodiments of the present invention. The digital airbrush tool may include a body 180 having a first end 182 and a second end 184. A first touch-point 186 and a second touch-point 188 may be disposed at the first end 182 of the digital airbrush tool 178. As will be understood, the touch-points 186 and 188 may be configured to be detected by a computing device having a touch-screen display when the touch-points 186 and 188 come into contact with the touch-screen display. The digital airbrush tool 178 may further include a grip contact 190. In some embodiments, the grip contact 190 is a conductive grip contact. Thus, the digital airbrush tool 178 may be configured such that a touch-screen display of a computing device will detect contact between the digital airbrush tool 178 and the touch-screen display only when a user holds the grip contact 190 and the touch-points 186 and 188 are in contact with the touch-screen of the computing device.

In embodiments of the digital coloring tools kit, each digital coloring tool includes a unique number of touch-points and/or conductive grip points, such that the type of digital coloring tool may be identified by the digital coloring tools kit application being executed on a computing device. For example, when contact is detected between the touch-screen and a digital coloring tool having two touch-points and a conductive grip point, the digital coloring tool may be recognized as the digital airbrush tool 178, which has, in embodiments, touch-points 186 and 188 and a grip contact 190. Similarly, in embodiments, the digital stamper may be identified based on a detection of three touch-points and a conductive grip; the digital pattern roller may be identified based on a detection of two touch-points; and the digital paintbrush tool may be identified based on a detection of a plurality of contacting conductive bristles and a conductive grip. Based on an identification of the tool that is contacting the touch-screen, an effect corresponding to the type of identified tool may be produced in the digital coloring environment.

Figure 20:
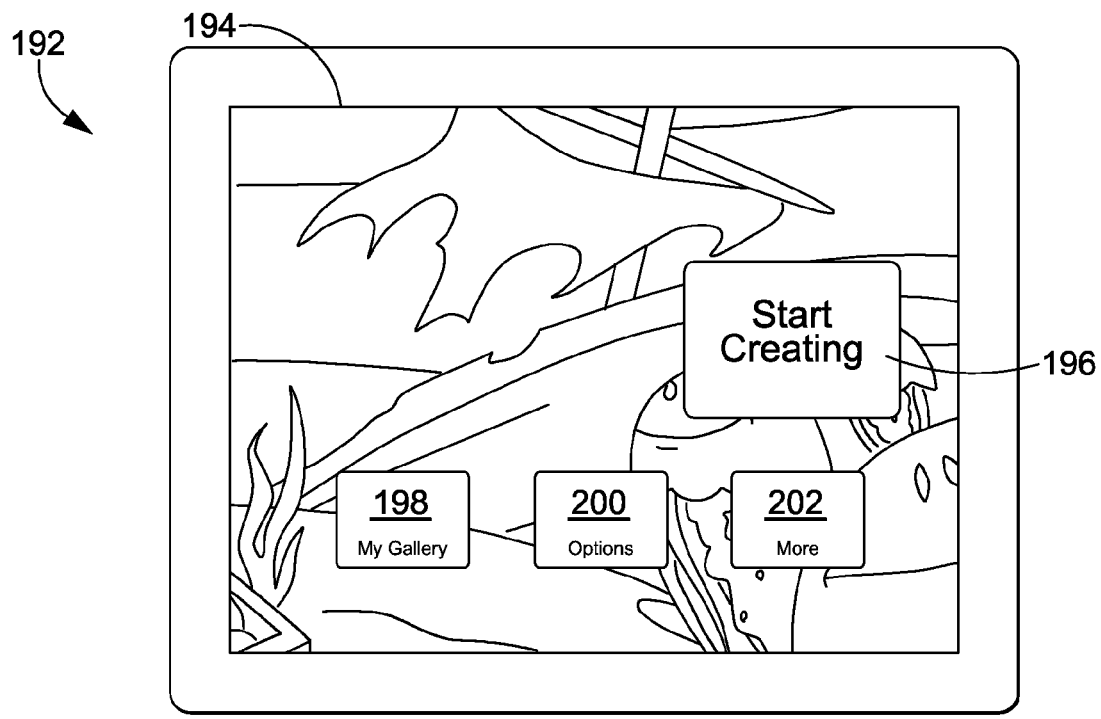
FIG. 20 is an exemplary display of a digital coloring tool application executed by a computing device, in accordance with an embodiment of the invention.

Turning now to FIG. 20, an exemplary user interface 192, which may be generated upon execution of the digital coloring tools kit application by a computing device, is illustrated. The display area 194 may include a number of indicators, including, for example, a "start creating" indicator 196, a "my gallery" indicator 198, an "options" indicator 200, a "more" indicator 202, an "unlock more" indicator (not shown), as well as any other number of indicators. Arrow indicators 216 and 218 may be used to navigate through various user interfaces provided in the included in the digital coloring tools kit application.

Figure 21:
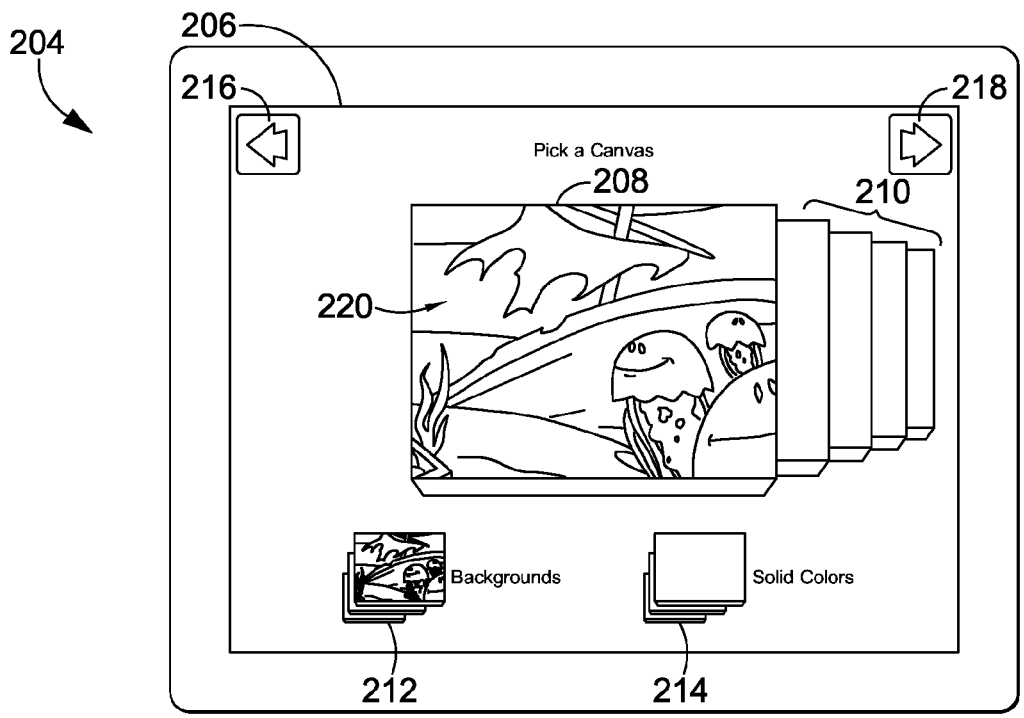
FIG. 21 is an exemplary display of a digital coloring tool application executed by a computing device, in accordance with an embodiment of the invention.

The "start creating" indicator 196 may be selected in order to begin creating in a digital coloring environment. In embodiments, upon selecting the "start creating" indicator 196, a user is presented with another user interface, such as the user interface 204 of FIG. 21. The display area 206 provides a number of background options, from which a user may select a background for the digital coloring environment. In embodiments, the background options include realistic/simulated backgrounds like canvas and watercolor surfaces for painting. For example, the display area 206 includes a selectable canvas 208, which includes canvas content 220. The display area 206 further includes a plurality of canvas options 210. A user may further toggle between different types of canvas content 220, including backgrounds, which may provide a coloring page background effect, and solid colors, which may provide a solid color backdrop for the digital coloring environment. A "backgrounds" indicator 212 and a "solid colors" indicator 214, corresponding to these different types of canvas content 220, may be provided.

In embodiments, an application associated with the digital coloring tools kit, for execution by a computing device such as a touch-screen device, may include thematic backgrounds such as an easel, canvas, watercolor paper, etc. In further embodiments, the application may include line art coloring-page backgrounds, fully-completed assets that can be stamped onto a display (such as a painted bee), pre-mixed colors, different brushes and/or brush tip effects for selection by a user, and different lay-down effects.

Figure 22:
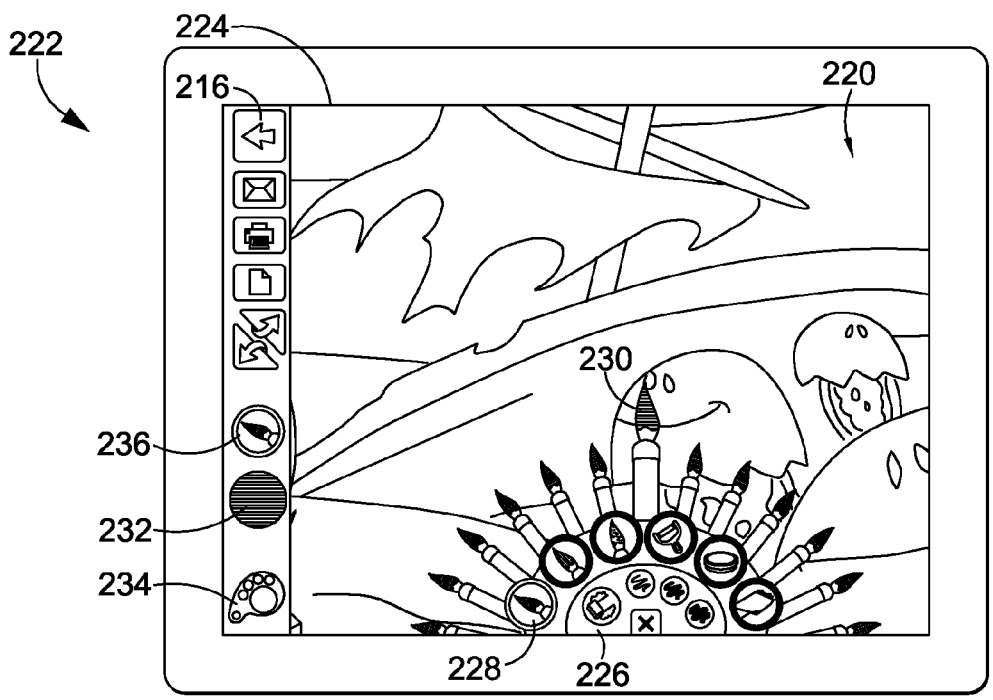
FIG. 22 is an exemplary digital coloring environment generated by a digital coloring tool application, with a first paintbrush tool selected, in accordance with an embodiment of the invention.

Turning now to FIG. 22, an exemplary user interface 222 that may be presented in the digital coloring environment is provided. The display area 224 includes canvas content 220 in the background of the digital coloring environment. A tool selection dial 226 provides a plurality of tool options, including a paintbrush, a watercolor paintbrush, a sparkle paintbrush, a pattern roller, a stamper, and an airbrush. Other tools corresponding to other art mediums and/or textures may be provided in the tool selection dial 226, as well. In embodiments, selection of an indicator corresponding to a particular tool option enables a user to add an enhancement to the digital coloring environment that corresponds to that particular type of tool. Furthermore, such enhancements may be added to the digital coloring environment via direct or indirect user interaction. A direct interaction may include a user selecting a tool option with the user's finger, and then using the user's finger to add the enhancement corresponding to the selected tool to the digital coloring environment. An indirect interaction may include a user selecting a tool option, and then using one of the digital coloring tools included in the digital coloring tools kit, such as the digital paintbrush tool 134, the digital pattern roller 156, the digital stamper tool 166, or the digital airbrush tool 178, to add the corresponding enhancement to the digital coloring environment. In other embodiments, an indirect interaction from a particular digital tool is recognized based on the number of touch-points and/or conductive grip locations. Thus, in such embodiments, a user need not initially select a tool option in order to add an enhancement to the digital coloring environment, but may instead simply begin indirect interaction with the digital coloring environment via a digital coloring tool.

Upon selection of a selected first paint texture 228, such as a selected paint texture that resembles oil paint, the tool selection dial presents a plurality of paintbrush tool indicators representing a plurality of color options that may be used in conjunction with that selected first paint texture 228, such as color option 230. Furthermore, for example, if an airbrush tool was selected from the tool selection dial 226, then the tool selection dial 226 would be populated with a plurality of airbrush tool indicators representing a plurality of color options. In embodiments, a selected medium and/or texture corresponding to the selected first paint texture 228 is displayed in the selected medium/texture window 236. For example, the selected medium/texture window may include an image of a paintbrush dipped in oil paint. Similarly, a selected color option, such as color option 230, is displayed in the selected color window 232. The user interface 222 may further include a virtual digital palette indicator 234, which will be discussed in more detail below.

In embodiments, the plurality of tool options included in the tool selection dial 226 provide options for generating various brush techniques, paint patterns, and other artistic enhancements in the digital coloring environment. For example, the kit may include a variety of traditional brushes (thick bristles, thin bristles, fanned bristles) for use with the touch-screen surface. Additionally, the application may generate a variety of patterns in response to user interaction with a paintbrush and the touch-screen, such as dotted, wavy, splattered, and/or dripped patterns. In further embodiments, as discussed above, various digital painting effects are provided that correspond with a particular type of virtual painting medium selected for painting, such as a kids paint, a watercolor paint, a glitter paint, a metallic paint, a crackle paint, etc. In one embodiment, a user may select from a variety of surprising paint types (such as animal fur paint, a growing vines paint, etc.) for simulation in the digital coloring tools environment.

Figure 23:
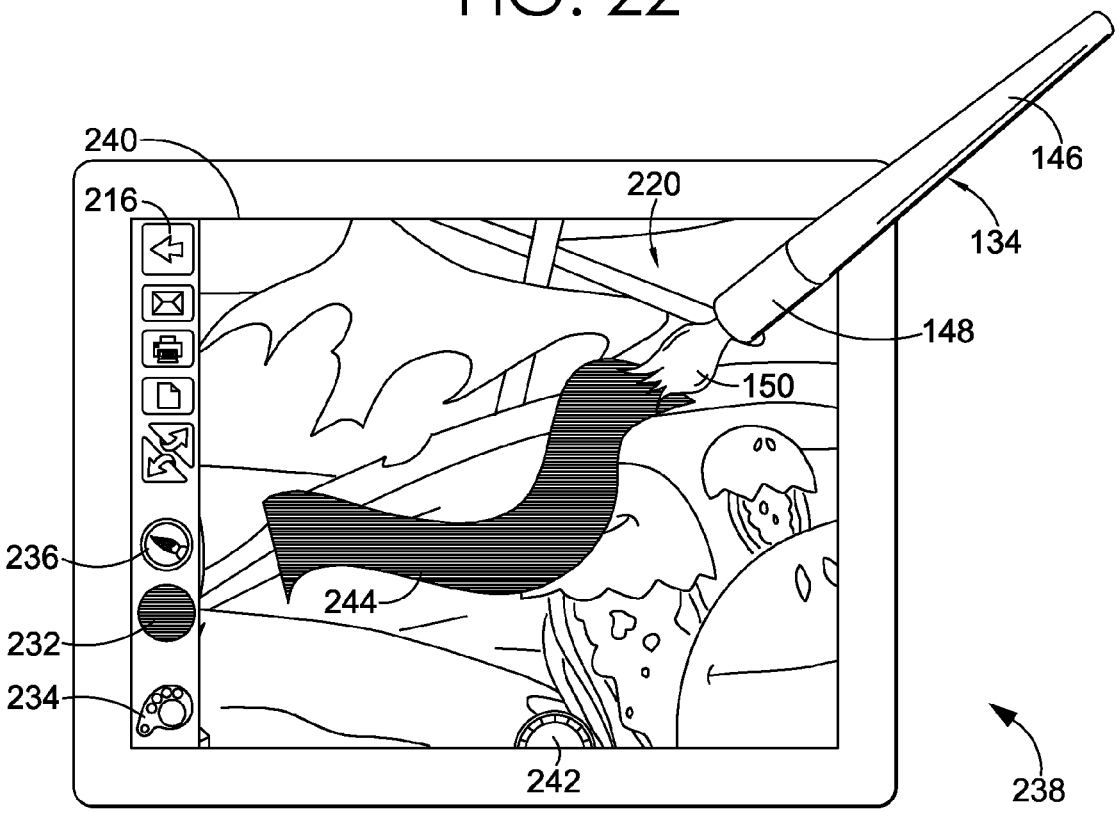
FIG. 23 is an exemplary digital coloring environment generated by a digital coloring tool application, with a marking by the selected first paintbrush tool of FIG. 22, in accordance with an embodiment of the invention.

In the exemplary user interface 238 of FIG. 23, display area 240 shows a coloring enhancement 244 that has been added to the digital coloring environment by a digital paintbrush tool 134. As mentioned, in embodiments, such interaction may also be provided by a digital paintbrush like the single touch-point brush 72 of FIG. 6. The medium/texture and color of the coloring enhancement 244 corresponds to the selected first paint texture 228 and the selected color option 230. The user interface 238 further shows a minimized dial 242, which corresponds to the tool selection dial 226 when such dial is not in use.

Figure 24:
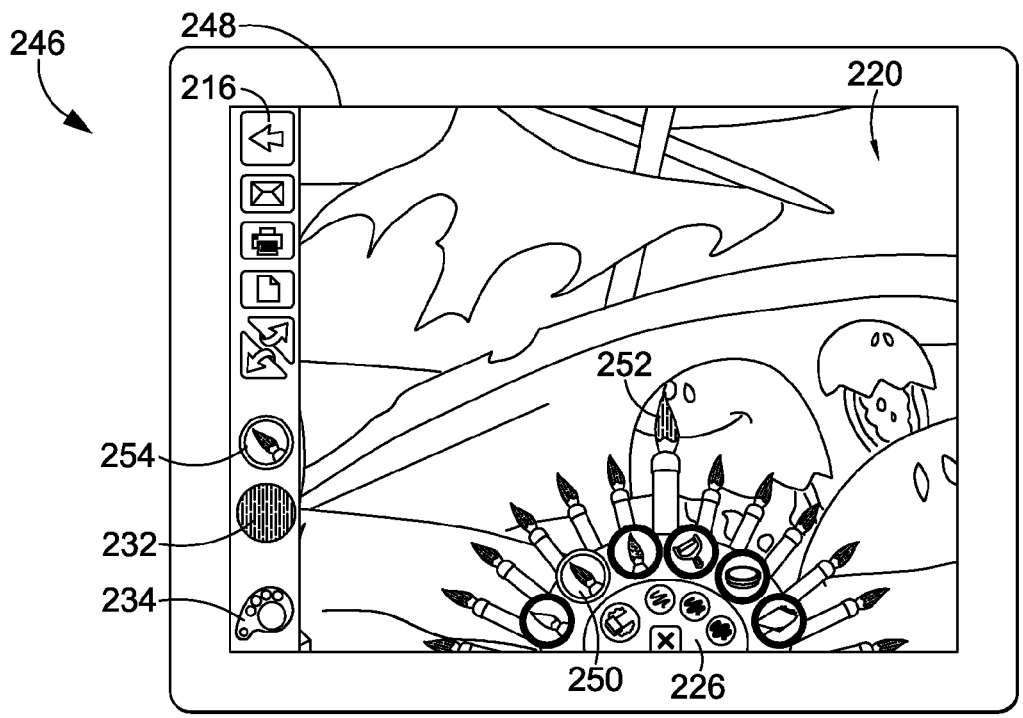
FIG. 24 is an exemplary digital coloring environment generated by a digital coloring tool application, with a second paintbrush tool selected, in accordance with an embodiment of the invention.
Figure 25:
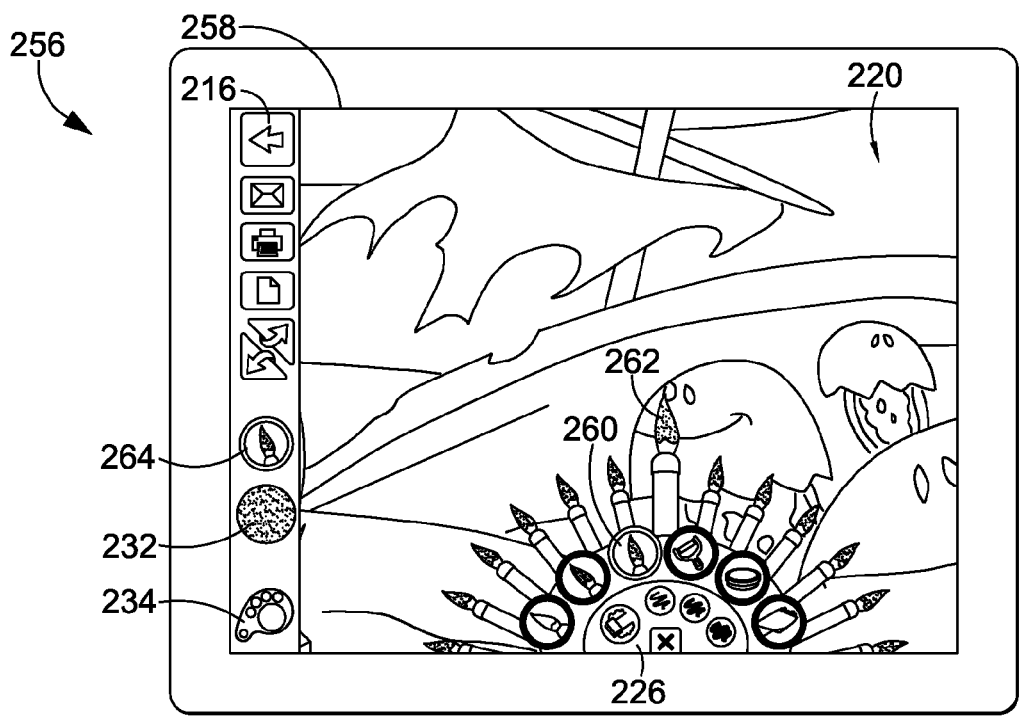
FIG. 25 is an exemplary digital coloring environment generated by a digital coloring tool application, with a third paintbrush tool selected, in accordance with an embodiment of the invention.

Turning now to FIG. 24, the exemplary user interface 246 includes a display area 248. A second selected paint texture 250 has been selected from the tool selection dial 226, and the second selected paint texture 250 is displayed in the selected medium/texture window 254. For example, the second selected paint texture 250 might be a water color paint texture, and an image of a paintbrush dipped in water color may be displayed in the selected medium/texture window 254. A second selected color option 252 is displayed in the selected color window 232. As can be imagined, when the user adds a coloring enhancement to the digital coloring environment, the appearance of the coloring enhancement will correspond to the second selected paint texture 250 and the second selected color option 252. Similarly, in FIG. 25, the user interface 256 depicts a third selected paint texture 260, which is displayed in the selected medium/texture window 264, as well as a third selected color option 262, which is displayed in the selected color window 232. The third selected paint texture 260 may be, for example, a sparkle paint texture. Again, when the user adds a coloring enhancement to the digital coloring environment, the appearance of the coloring enhancement will correspond to the third selected paint texture 260 and the third selected color option 262.

Turning now to FIGS. 26-29, a virtual digital paint palette 270 is illustrated in accordance with embodiments of the present invention. As mentioned, the virtual digital paint palette 270 may provide various features and/or functions associated with the dynamic digital paint palette of FIGS. 4-8. As such, all of those details will not be repeated here. A user may interact with the virtual digital paint palette 270 directly or indirectly, using a user's finger or using a digital tool included in the digital coloring tools kit. User interface 266 of FIG. 26 includes a display area 268, which presents the virtual digital paint palette 270 with multiple paint pots 272 and a mixing area 278. The multiple paint pots include a variety of color options, including a first color 274 and a second color 276. The mixing area 278, which is empty in the exemplary user interface 266, may be used to virtually mix various colors. For example, a first color 274 may be selected for addition to the mixing area 278. Such selection may be accomplished via the digital paintbrush tool 134, or by the user's finger. For example, the user may tap the first color 274 and the first color 274 may be automatically added to the mixing area 278, the user may tap the first color 274 and then tap the mixing area 278 to add the first color 274 to the mixing area 278, the user may drag the first color 274 into the mixing area 278. Other means of selecting a first color 274 to be added to the mixing area 278 may be imagined and are included within the scope of the present invention. Then, as shown in the display area 282 included in the exemplary user interface 280 of FIG. 27, the selected first color 284 is displayed in the mixing area 278.

Additionally, a user may select a second color to add to the mixing area 278. For example, the user interface 286 of FIG.

28 includes a display area 288, in which the second color 276 has been added to the mixing area 278. Once two or more colors have been added to the mixing area 278, the multiple colors may be displayed as a swirl pattern 290, indicating that the colors have not yet been thoroughly mixed. The unmixed paint colors may be used to paint in the digital coloring environment using, for example, the digital paintbrush tool 134, and such painting may include paint brush strokes that include a swirl pattern, instead of a solid color. Then, as shown in the display area 294 included in the exemplary user interface 292 of FIG. 29, a user can mix the selected colors in the mixing area 278 with the digital paintbrush tool 134, or with the user's finger, by swirling the digital paintbrush tool 134 or the user's finger in order to swirl and thoroughly mix the selected colors. Such interaction by the user may produce a mixed color 296. In embodiments, an amount of color added to the mixing area is determined based on an amount of times a user taps a particular paint palette opening. In one example, colors are mixed in a one-to-one ratio unless the user adds more taps of a color than another.

As described above, mixing of colors using the digital paintbrush tool may, in some embodiments, be a gradual mixing based on the techniques executed as part of the application. For example, mixed colors may remain bright rather than becoming muddy gray/brown upon mixing. In some embodiments, color mixing will have two distinct stages for creation—a first stage where colors are initially swirled together, and a second stage where a user is able to paint with a fully-mixed color. Accordingly, in one embodiment, the touch-screen device may display the swirled paint upon selection of at least two colors for mixing, and may provide the fully mixed color in response to a threshold amount of time and/or an amount of swirling motion created by the user with the digital paintbrush.

In embodiments, the mixing of colors in the mixing area 278 simulates real-life mixing of colors. For example, the mixing of one color with another color may produce the same mixed color that would be produce by a real-life mixing of the two colors. In other embodiments, the resulting color produced by mixing multiple colors may deviate from a real-life mixing result, and the virtual digital palette may instead provide only aesthetically pleasing colors. To this end, the virtual digital paint palette may further include an over-saturation adjustment mechanism. The over-saturation adjustment mechanism may enable a user to return to a "true" color, wherein a "true" color refers to a single color that has not been mixed with other colors, by oversaturating the mixing area 278 with that color. For example, a user may select a first color, a second color, and a third color to add to the mixing area 278. The user may then swirl the colors in the mixing area 278 in order to obtain a mixed color. If a user then wishes to return to a true color corresponding to the first selected color, the user may select the first color repeatedly until, eventually, the over-saturation adjustment mechanism causes the color displayed in the mixing area 278 to correspond to the true first color, not tinted by or mixed with any other colors. In this way, a user may turn an undesirable muddy color included in the mixing area 278 into a pure yellow, for example. The user may then paint with the pure yellow, or resume mixing with other colors in order to obtain a desirable color. In this way, the over-saturation adjustment mechanism ensures a good user experience.

Figure 30:
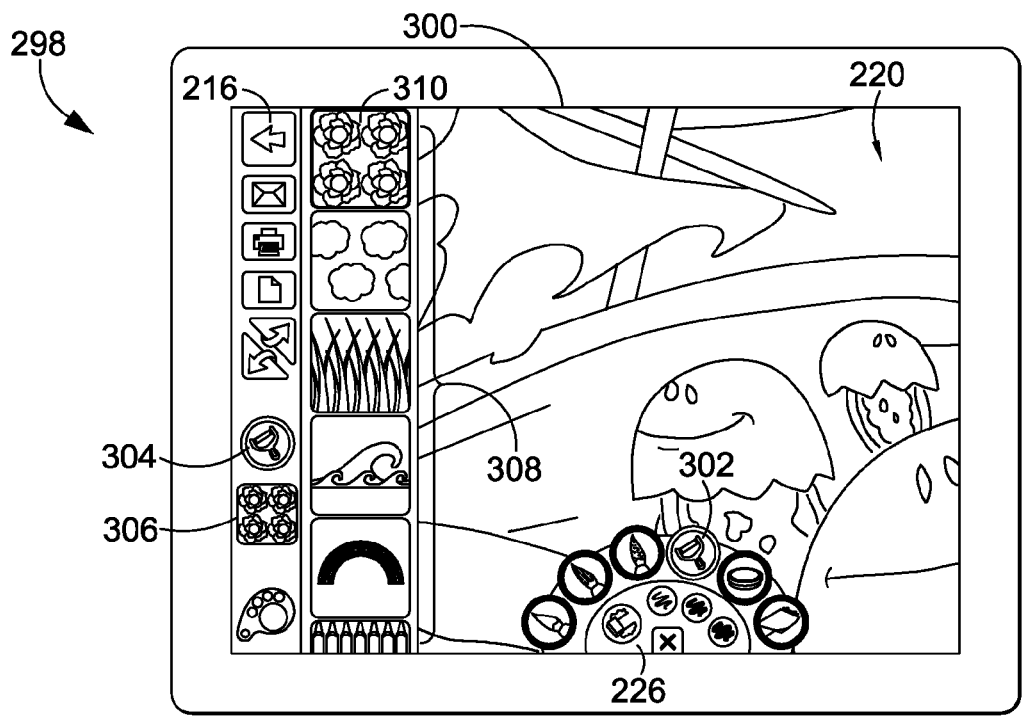
FIG. 30 is an exemplary digital coloring environment generated by a digital coloring tools application, with a digital pattern roller selected, in accordance with an embodiment of the invention.
Figure 31:
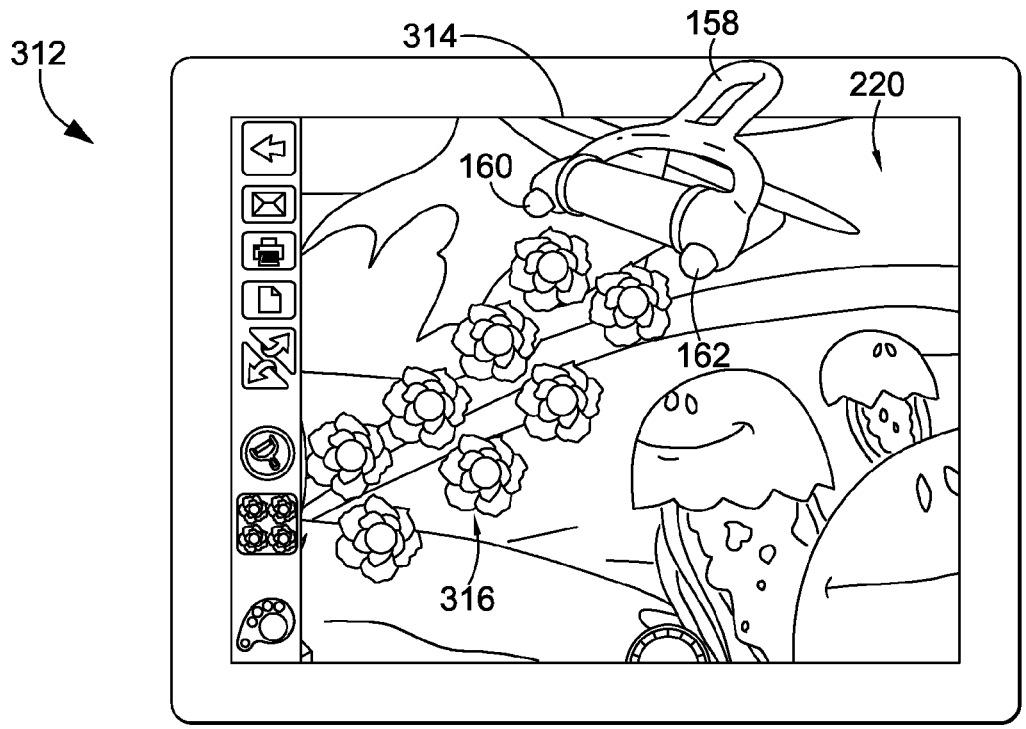
FIG. 31 is an exemplary digital coloring environment generated by a digital coloring tool application, with a marking by the selected digital pattern roller of FIG. 30, in accordance with an embodiment of the invention.

As illustrated in the display 300 of the exemplary user interface 298 of FIG. 30, enhancements may additionally be provided to a digital coloring environment by a digital pattern roller tool, such as the digital pattern roller 156 of FIG. 17, or by selecting a digital pattern roller tool option 302 from the tool selection dial 226. Upon selection of the digital pattern roller tool option 302, or upon touching the digital pattern roller 156 to the touch-screen of a computing device, an image of the pattern roller tool may populate the tool selection window 304 and a plurality of patterns 308 may be presented. A selected pattern 310 may be selected for use in enhancing the digital coloring environment, and such pattern is populated in the pattern selection window 306.

Upon selecting a pattern, a user may begin adding the selected pattern to the digital coloring environment either directly, via the user's finger, or indirectly, via the digital pattern roller 156. This is illustrated in the exemplary user interface 312 of FIG. 31, which includes a display 314. In embodiments, the digital pattern roller 156 contacts the screen, such that touch-points 160 and 162 are in contact with the screen, and the digital pattern roller 156 is dragged across the screen. As the digital pattern roller 156 is dragged across the screen, a corresponding enhancement 316 is added to the digital coloring environment, producing the effect of a pattern being rolled across the screen by a paint roller. As mentioned, in some instances, the same effect may be provided by a user's finger.

Figure 32:
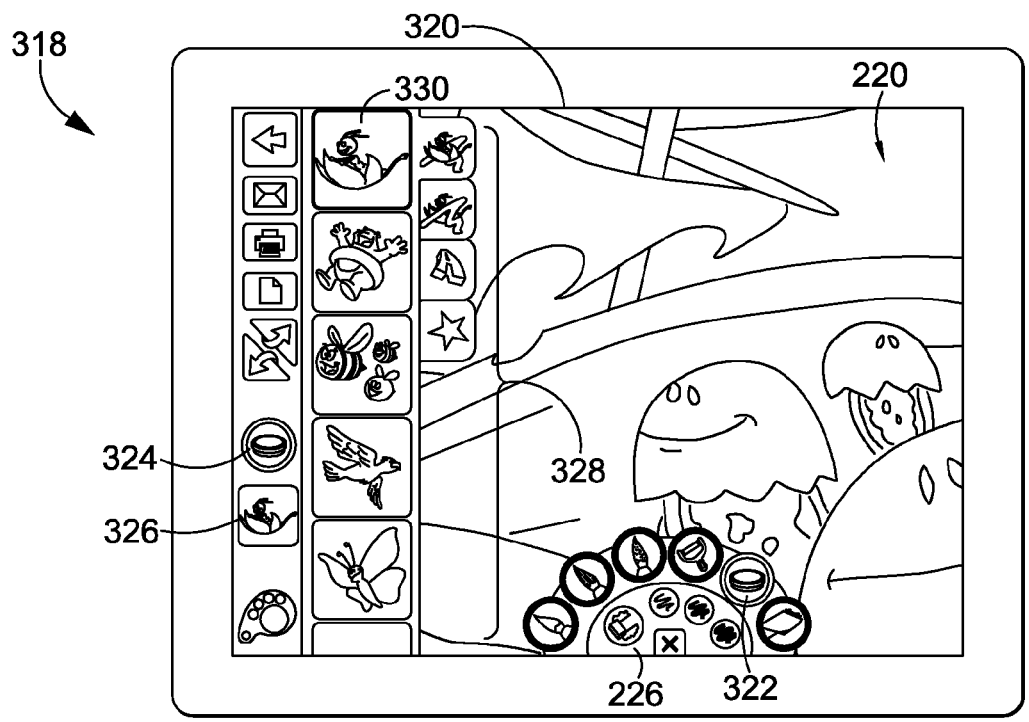
FIG. 32 is an exemplary digital coloring environment generated by a digital coloring tools application, with a digital stamper tool selected, in accordance with an embodiment of the invention.
Figure 33:
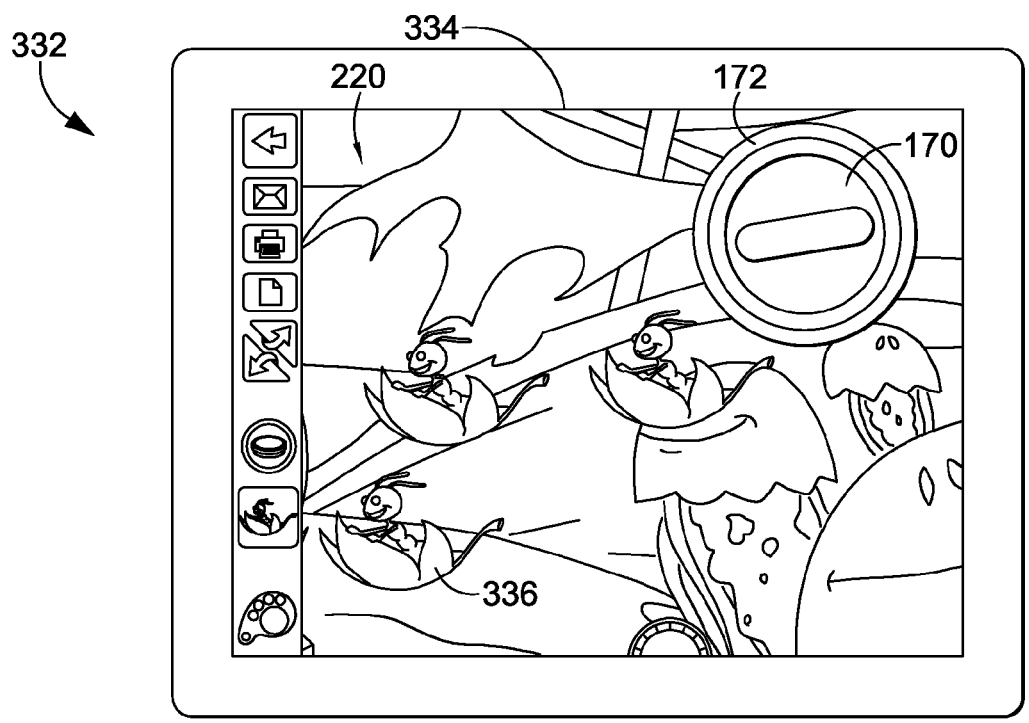
FIG. 33 is an exemplary digital coloring environment generated by a digital coloring tool application, with a marking by the selected digital stamper tool of FIG. 32, in accordance with an embodiment of the invention.

Turning now to FIG. 32, the exemplary user interface 318 includes a display 320 in which enhancements corresponding to a stamper tool may be added to a digital coloring environment. Such enhancements may be provided to a digital coloring environment by a digital stamper, such as the digital stamper 46 of FIGS. 2-3, the digital stamper tool 166 of FIG. 18A-18B, or by selecting a digital stamper tool option 322 from the tool selection dial 226. Upon selection of the digital stamper tool option 322, or upon touching the digital stamper tool 166 to the touch-screen of a computing device, an image of the stamper tool may populate the tool selection window 324 and a plurality of stamp images 328 may be presented. A selected image 330 may be selected for use in enhancing the digital coloring environment, and such image is populated in the image selection window 326.

Upon selecting an image for stamping, a user may begin adding the selected image to the digital coloring environment either directly, via the user's finger, or indirectly, via the digital stamper tool 166. This is illustrated in the exemplary user interface 332 of FIG. 33, which includes a display 334. In embodiments, the digital stamper tool 166, which includes a stamp base 170 and a grip 172, contacts the screen, such that touch-points of the stamper tool, such as touch-point 176 of FIG. 18B, are in contact with the screen. Upon such contact, a stamped image 336 is added to the digital coloring environment.

The enhancements added to the digital coloring environment by the stamper tool may include stamped, pre-made artwork for a user to paint in, on, or around, or otherwise interact with during painting. For example, a fully-painted asset may be stamped onto the screen using the digital stamper tool 166, while in other embodiments, a newly-added stamped item (from touching the digital stamper tool 166 to the touch-screen surface) may be enhanced with additional amounts of paint once stamped. For example, a user may paint over a stamped item, or may color in or change colors of the stamped item. In one embodiment, the digital paintbrush tool 134 and/or digital stamper tool 166 may be used to manipulate items stamped on the screen, such as re-sizing, rotating, moving, blending, coloring, etc. In another embodiment of the invention, a variety of stamping effects are provided to create a visual impression of a particular painting technique, such as sponge painting on the surface of the touch-screen device.

In some embodiments, as part of the digital application provided with the digital coloring tools kit, a user may be able to purchase additional, digital enhancements for the application (i.e., "in-app purchases") that further enhance the user's experience, such as updating the digital coloring tools kit with additional backgrounds, stamps, lay-down painting effects, etc.

Figure 34:
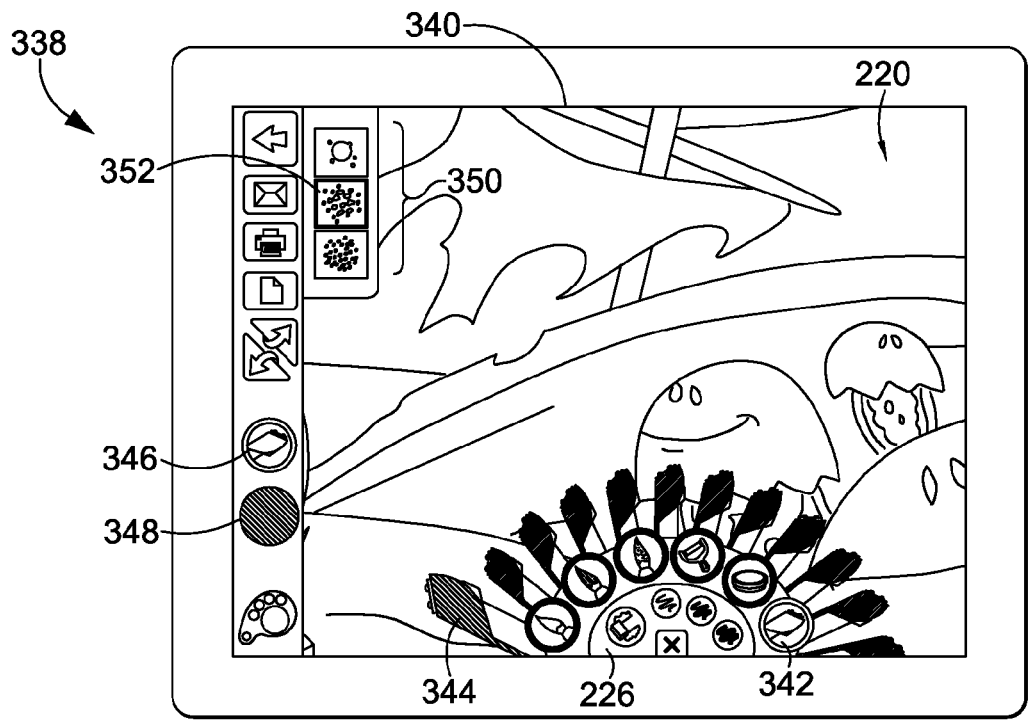
FIG. 34 is an exemplary digital coloring environment generated by a digital coloring tools application, with a digital airbrush tool selected, in accordance with an embodiment of the invention.
Figure 35:
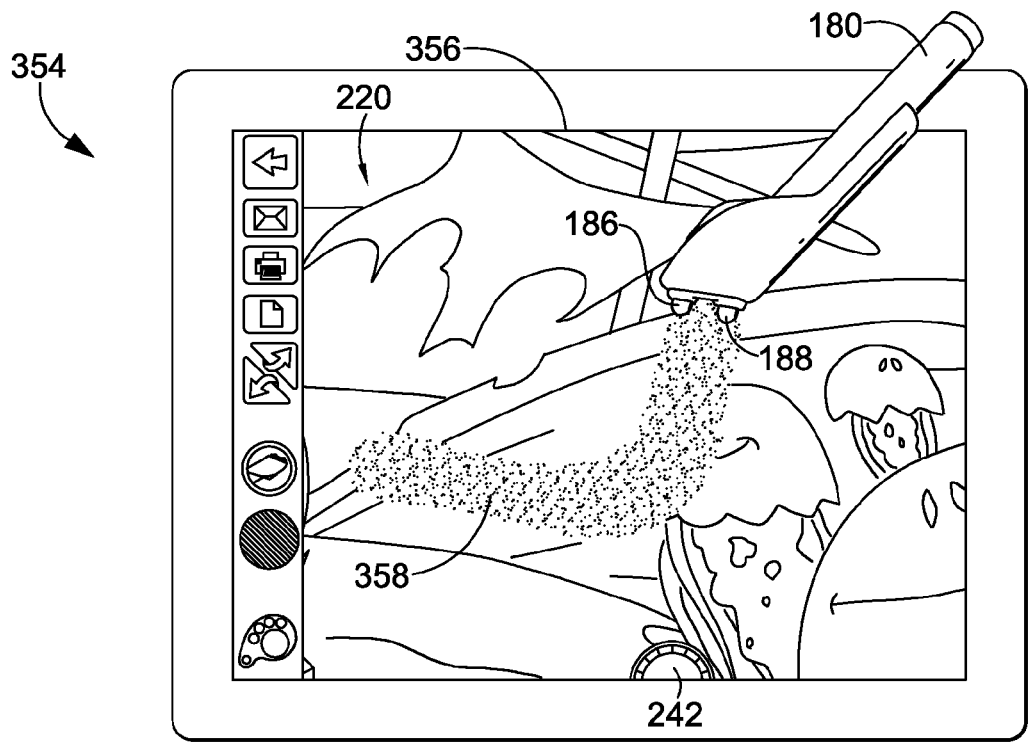
FIG. 35 is an exemplary digital coloring environment generated by a digital coloring tool application, with a marking by the selected digital airbrush tool of FIG. 34, in accordance with an embodiment of the invention.

FIGS. 34-35 provide exemplary illustrations of enhancements that may be added to a digital coloring environment using a digital airbrush tool. The exemplary user interface 338 of FIG. 34 includes a display area 340. Airbrushing enhancements may be provided to a digital coloring environment by a digital airbrushing tool, such as the digital airbrush tool 178 of FIG. 19, or by selecting a digital airbrushing tool option 342 from the tool selection dial 226. Upon selection of the digital airbrushing tool option 342, or upon touching the digital airbrush tool 178 to the touch-screen of a computing device, an image of the airbrushing tool may populate the tool selection window 346 and a plurality of airbrushing effects 350 may be presented. The airbrushing effects may include airbrushing of various patterns, densities, or other visual aspects associated with airbrushing. A selected airbrushing effect 352 may be selected for use in enhancing the digital coloring environment, and such effect may be populated in the selection window 348. Additionally, upon selecting the digital airbrushing tool option 342, or upon touching the digital airbrush tool 178 to the touch-screen of a computing device, a plurality of color options may be presented on the tool selection dial, such that a user may select a color for use in conjunction with the airbrushing tool. Such selected color 344 may be populated in the selection window 348.

Upon selecting an airbrushing effect and color, a user may begin adding the airbrushing enhancement to the digital coloring environment either directly, via the user's finger, or indirectly, via the digital airbrush tool 178. This is illustrated in the exemplary user interface 354 of FIG. 35 which includes a display 356. In embodiments, the digital airbrush tool 178 contacts the screen, such that touch-points 186 and 188 are in contact with the screen, and the digital airbrush tool 178 is dragged across the screen. As the digital airbrush tool 178 is dragged across the screen, a corresponding enhancement 358 is added to the digital coloring environment, producing an airbrushing effect. As mentioned, in some instances, the same effect may be provided by a user's finger.

Figure 36:
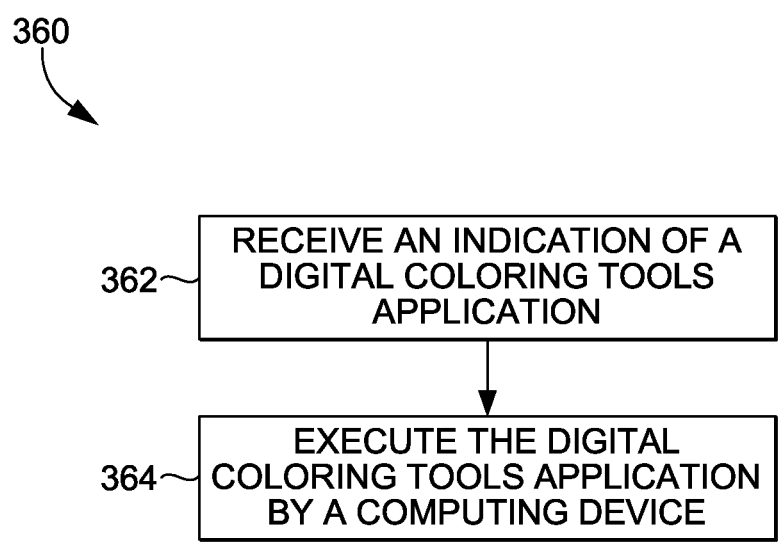
FIG. 36 is an exemplary method including steps for providing an interactive digital coloring tools environment, in accordance with an embodiment of the invention.

FIG. 36 illustrates an exemplary method 360 for providing an interactive digital coloring tools environment. At step 362, an indication of a digital coloring tools application is received. At step 364, the digital coloring tools application is generated by a computing device. In embodiments, such execution of the digital coloring tools application comprises presenting an interactive digital coloring environment on a touch-screen display of a computing device.

As mentioned, in embodiments, the digital coloring tools kit includes a digital coloring tools kit application that, upon execution by a computing device, such as the computing device 12, is configured to generate a digital coloring environment. In further embodiments, the digital coloring tools kit includes an activation feature for such a digital coloring tools kit application. For example, the digital coloring tools kit might include the DigiTools™ Paint application, or an activation feature for the DigiTools™ Paint application. The activation feature may include an activation code and/or an activation indicator, such as a web page, website URL, or other indicator of a resource from which a user may access one or more features of the application. In some embodiments, user interaction with the activation feature enables and/or activates a digital coloring tools kit application retrieved by using the activation feature, and/or a digital coloring tools kit application associated with the activation feature.

In further embodiments, a non-user-specific application, such as Crayola ColorStudio HD™, is downloaded from an external source, and the specific features for the digital coloring tools kit application may then be activated and/or "unlocked," by an activation feature. In this instance, the activation feature may involve touching a component included in the user-specific kit to the touch-screen of the computing device running the non-user-specific application. For example, a user may download ColorStudio HD™ to a computing device, and then touch a digital stamper included in a user-specific digital coloring tools kit, such as the digital stamper 46 of FIG. 2 or the digital stamper tool 166 of FIGS. 18A-18B, to the touch-screen of the computing device in order to activate specific features associated with the digital coloring tools kit application. In other embodiments, a digital paintbrush tool, which may include features similar to the single touch-point brush 72 of FIG. 6 or the digital paintbrush tool 134 of FIGS. 16A-16B, is used to unlock and/or activate the digital coloring tools kit application.

Upon enabling/activation, the digital coloring tools kit application may be accessed, retrieved from, downloaded, and/or otherwise interacted with via a source separate from the digital coloring tools kit. For example, the digital coloring tools kit application may be accessed and/or downloaded from a website, a database, a data store, or any other external source that may provide applications. An example of an external source is the online iTunes® store.

Embodiments of the digital coloring tools kit further include an application, such as the DigiTools™ Paint application, that provides a first tier of options available to a user upon purchase of the digital coloring tools kit, and a second tier of options available to the user upon "unlocking" a full mode of the digital coloring tools kit. In one example, a user may purchase the digital coloring tools kit, which may include an application that enables the user to access a "try me" mode of the product. The "try me" mode may allow, for example, a user to utilize a limited number of features, such as backgrounds, effects, color mixing techniques, etc. In another example, the user may "unlock" a full mode of the purchased digital coloring tools kit to activate additional options, such as options for painting with a mixed color, blending of particular colors, and activating additional features of the digital coloring tools kit that may be limited and/or restricted based on which mode a user is executing. In one embodiment, a digital stamper is used to unlock additional features of the digital coloring tools kit application. In other embodiments, a digital stamper, or another component included in the digital coloring tools kit, such as the digital paint palette 60 of FIG. 4, may be used to activate and/or unlock a particular mode of the application, such as a limited mode or a full mode. In one embodiment, a particular user interaction screen associated with the digital coloring tools kit application may be presented to a user for activation of the digital coloring tools kit application and/or features. For example, additional enhancement options corresponding to the use of one or more of the digital coloring tools may be enabled based on activation of the digital coloring tools kit application.

Figure 9:
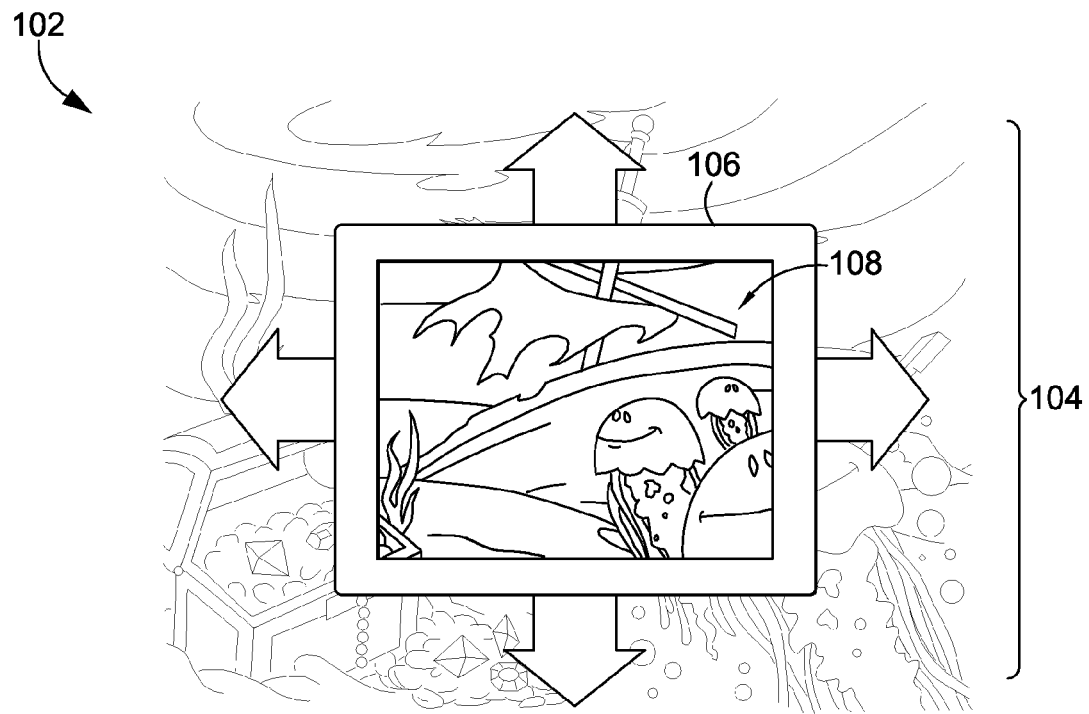
FIG. 9 is a top view of a touch-screen device for implementing embodiments of a panoramic coloring kit, in accordance with an embodiment of the invention.

With reference to FIG. 9, a panoramic coloring kit 102 for digitally coloring a 360-degree coloring environment is depicted according to an embodiment of the invention. In one embodiment, the panoramic coloring kit 102 includes a simulated 360-degree coloring environment 104 in which a computing device 106, such as the computing device 12 of FIG. 13, which may include an iPad® or other touch-screen device, captures a selected scene 108 for coloring by a user on the touch-screen surface of the computing device 106.

As indicated by the arrows in FIG. 9, a user may maneuver the computing device 106 up, down, left, or right to manipulate a location of the selected scene 108 with respect to the coloring environment 104. As such, a user may select a particular portion of the virtual coloring environment 104 for coloring.

Figure 10:
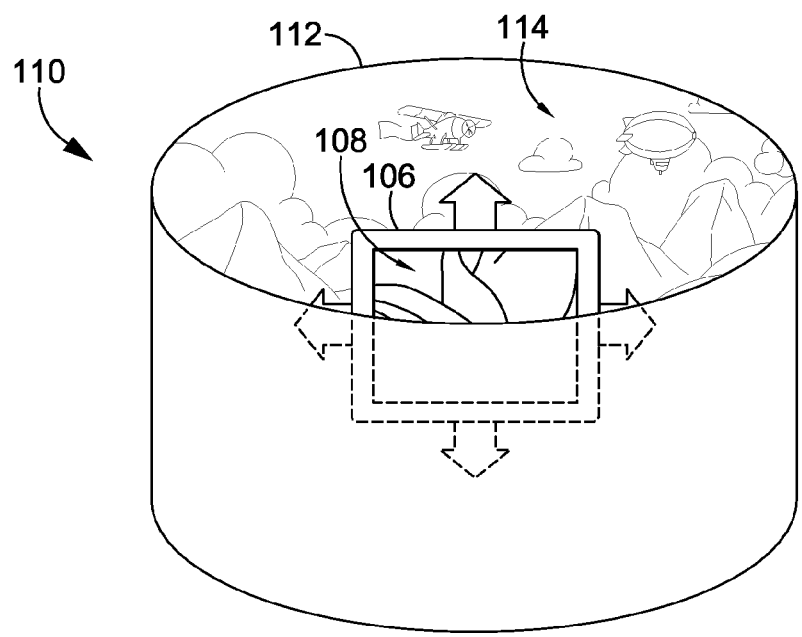
FIG. 10 is a perspective view of a 360-degree digital coloring environment generated in association with the panoramic coloring kit, in accordance with an embodiment of the invention.

In FIG. 10, a perspective view 110 of a virtual tour 112 inside a 360-degree coloring environment 114 is described in accordance with an embodiment of the invention. In embodiments, the panoramic coloring scene in the 360-degree virtual coloring environment 114 is populated with a variety of objects and figures with which the user may interact, such as by coloring. When viewed with the computing device 106, embodiments of the coloring environment 114 may include looping animations in a background of a scene, more robust animations in foreground objects, and other animated enhancements to the coloring environment 114. In some embodiments, the virtual tour 112 of the coloring environment 114 allows the user to physically maneuver the computing device 106 to change the portion of the coloring environment 114 that is available for selection by the user (i.e., change which portion of the coloring environment 114 may populate the display of the computing device 106 for selection). For example, a user may rotate around an axis while holding the computing device 106.

Embodiments of the panoramic coloring kit 102 include an application that provides a first tier of options available to a user upon purchase of the panoramic coloring kit 102, and a second tier of options available to the user upon "unlocking" a full mode of the panoramic coloring kit 102. In one example, a user may purchase the panoramic coloring kit 102 with a carrying case and/or computing device holder (e.g., iPad® holder), a digital stylus, a digital stamper, and a spyglass tool. The user may also purchase, as part of the panoramic coloring kit 102 or as an associated or accessible feature available to the purchaser of the panoramic coloring kit 102, an application that enables the user to access a "try me" mode of the product. The "try me" mode of the panoramic coloring kit 102 may allow access to a limited number of features, such as a single scene, use of a single stamp (i.e., a stamp/sticker image that appears on a screen of the computing device 106 based upon stamping with a digital stamper tool), and/or a spyglass. In another example, the user may "unlock" a full mode of the purchased panoramic coloring kit 102 to activate additional options such as hidden animations, additional coloring scenes, and other features of the panoramic coloring kit 102 that may be limited and/or restricted based on which mode a user is executing. In one embodiment, a digital stamper, such as the digital stamper 46 of FIG. 2, may be used to activate and/or unlock a particular mode of the application, such as a limited mode or a full mode.

In some embodiments, the panoramic coloring kit 102 includes a digital coloring stylus or other digital input device for selection and/or coloring of items within a selected scene 108. For example, in one embodiment, the single touch-point brush 72 depicted in FIG. 6 may be used to digitally color in portions of the selected scene 108 (for example, a single touch-point brush 72, with or without the paintbrush bristles 80 surrounding the single touch-point 76).

In some embodiments of the invention, a panoramic coloring kit 102 may include a three touch-point stamper, such as the digital stamper 46 discussed with reference to FIGS. 2-3. As used with embodiments of the panoramic coloring kit 102, the digital stamper 46 may be used to add new objects to a 360-degree coloring environment (such as coloring environments 104 and 114 depicted in FIGS. 9-10.) For example, a user may add additional characters to a selected scene 108, which may then be animated based on interactive features of an application. In embodiments, a digital sticker may be added to a selected scene 108 based on contacting a plurality of touch-points on a bottom surface 50 of a digital stamper 46 with the touch-screen surface of a computing device 106.

Embodiments of a user interface displayed on a computing device 106 in association with the panoramic coloring kit 102 include a launch screen that prompts a user to select one or more features, including, for example, a "start creating" indicator, a "my gallery" indicator, an "options" indicator, a "more Crayola" indicator, and an "unlock more," indicator. In one embodiment, a scene selection feature for initiating coloring with the panoramic coloring kit 102 may include multiple options for a user. For example, a scene selection feature may provide an explore mode that lets a user choose a scene and pick a coloring page from that scene, such as picking a selected scene from an animated, panning image displayed on the computing device screen. As another example, the scene selection feature may provide a pre-selected image mode where a user selects a scene to start coloring from a set of pre-selected coloring pages. In that example, the user may begin coloring the pre-selected scene, and subsequently explore other portions of the panoramic view of an associated coloring environment. In that embodiment, a pre-selected coloring page may include a particular call to action, such as a coloring page that instructs the user to "Find the Hidden Octopus."

As discussed above, embodiments of the invention allow a user to interact with a panoramic coloring environment. In some embodiments, a 360-degree virtual tour effect allows a user to navigate through a large coloring page by physically moving a computing device, such as an iPad, up and down, and turning the user around in place. In one example, as an object enters the center portion of the iPad® screen, an animation and/or sound associated with that object may be played. In another example, some objects in the panoramic coloring environment remain in constant motion around the scene. In one embodiment, a user may tap the screen of a computing device having a touch-screen to freeze the motion of the 360-degree virtual tour, and thereby provide an indication of selection to color a particular selected scene. In one embodiment, the 360 degree virtual tour may present the panoramic coloring environment to a user with distorted and/or multi-dimensional appearance. As such, upon selection of a particular scene for coloring, the screen may quickly fade into a non-distorted coloring page.

Figure 11:
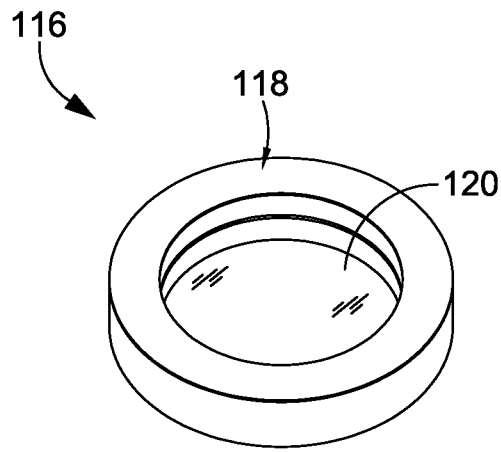
FIG. 11 is a top perspective view of a spyglass tool, in accordance with an embodiment of the invention.
Figure 12:
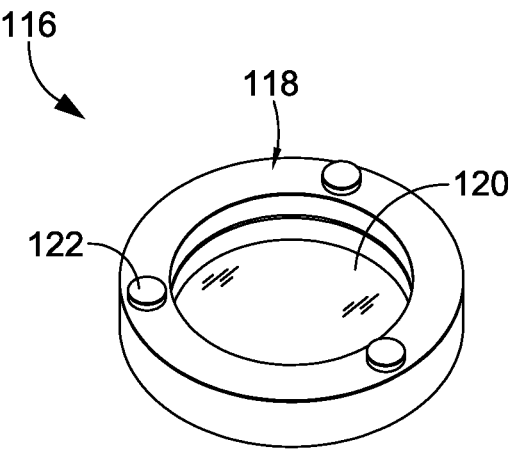
FIG. 12 is a bottom perspective view of the spyglass tool of FIG. 11, in accordance with an embodiment of the invention.

Embodiments of the panoramic coloring kit 102 may include, in a 360 coloring mode, a coloring inside the lines feature, a feature for stamping new objects into a scene (that may then also be added to the scene in explore mode) and other added features while coloring a selected scene from the panoramic view. While coloring, in some embodiments, a spyglass tool may be used. Accordingly, the panoramic coloring kit 102 may also include a spyglass tool 116 depicted in FIGS. 11 and 12. Placement of the spyglass tool 116 on at least a portion of the selected scene 108 may cause one or more enhancements to be activated in the coloring environment, such as the discovery of hidden objects with the spyglass tool 116, or selective animation of objects that were previously motionless. The spyglass tool 116 can detect hidden animations on a coloring page (i.e., in a selected scene), and when hidden animations are found, they may be populated in the explore mode (e.g., when returning to the virtual tour). In some embodiments, an achievement message may be presented upon detecting a particular hidden animation, such as a "You found X!" statement that flashes across the screen. When finished coloring, a user may return to exploring the coloring environment, where the items that the user colored in when in coloring mode now appear in color in the explore mode. In some embodiments, a user may toggle between a coloring mode to an explore mode based on pressing a button on a computing device, such as pressing a button on the iPad to move from a static coloring scene to a panning view of the 360-degree coloring environment.

Having colored, activated, manipulated, stamped, and otherwise altered at least a portion of the coloring environment, a user may then save a scene, such as by using an auto-saving feature of an application. In one example, the user may return to a saved scene to finish coloring the scene. In further embodiments, a user may select a "start over" option to save a current state of a scene as a separate scene.

In some embodiments, as part of the digital application provided with the panoramic coloring kit 102, a user may be able to purchase additional, digital enhancements for the application (i.e., "in-app purchases") that further enhance the user's experience, such as updating the panoramic coloring kit 102 with new scenes, and providing new stamp images for stamping into a new scene, etc.

The following U.S. patent applications are hereby incorporated by reference in their entirety: U.S. Provisional Application No. 61/788,371 entitled "Digital Coloring Tools Kit with Panoramic View and Create-to-Destroy Interactive Features," filed Mar. 15, 2013, U.S. Nonprovisional application Ser. No. 14/211,815, entitled "Panoramic Coloring Kit," filed Mar. 14, 2014, U.S. Provisional Application No. 61/788,349, entitled "Personalized Digital Animation and Digital Collage Creation Kit," filed Mar. 15, 2013, U.S. Nonprovisional application Ser. No. 14/213,526, entitled "Digital Collage Creation Kit," filed Mar. 14, 2014, U.S. Nonprovisional application Ser. No. 14/213,564, entitled "Personalized Digital Animation Kit," filed Mar. 14, 2014, U.S. Provisional Application No. 61/788,381, entitled "Digital Fashion Portfolio and Green Screen Animation Kit," and U.S. Nonprovisional application Ser. No. 14/213,586, entitled "Coloring Kit for Capturing and Animating Two-dimensional Colored Creation," filed Mar. 14, 2014.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A digital coloring tools kit comprising:
   a digital paintbrush tool;
   a digital stamper; and
   a color mixing paint palette,
   wherein the digital paintbrush tool, the digital stamper, and the color mixing paint palette are configured to interact with a touch-screen surface of a computing device executing a digital coloring tools kit application to provide a digital coloring environment on the touch-screen surface, wherein the digital coloring environment is configured to present at least a portion of the color mixing paint palette in response to user interaction with the touch-screen surface of the computing device.

2. The digital coloring tools kit of claim 1 further comprising:
   an activation feature for the digital coloring tools kit application, wherein upon executing the digital coloring tools kit application by the computing device, the digital coloring tools kit application generates the digital coloring environment configured to interact with at least one of the digital paintbrush tool, the digital stamper, and the color mixing paint palette.

3. The digital coloring tools kit of claim 1, wherein the at least a portion of the color mixing paint palette is configured to receive an indication of a first selected paint color based on user interaction with at least a portion of the touch-screen surface corresponding to a first opening of the color mixing paint palette.

4. The digital coloring tools kit of claim 3, wherein the at least a portion of the color mixing paint palette is configured to receive an indication of a second selected paint color based on user interaction with at least a portion of the touch-screen surface corresponding to a second opening of the color mixing paint palette.

5. The digital coloring tools kit of claim 4, wherein a mixing area of the at least a portion of the color mixing paint palette is configured to display the first selected paint color and the second selected paint color.

6. The digital coloring tools kit of claim 5, wherein the mixing area is configured to display the first selected paint color and the second selected paint color in response to interaction of the digital paintbrush tool with at least a portion of the touch-screen surface corresponding to at least a portion of the color mixing paint palette.

7. A digital coloring tools kit comprising:
   an activation feature for a digital coloring tools kit application, wherein a digital coloring environment is generated for presentation on a touch-screen surface of a computing device upon executing the digital coloring tools kit application;
   a digital paintbrush tool configured to interact with the digital coloring environment; and
   a digital, color mixing paint palette associated with the digital coloring environment wherein the digital coloring environment comprises a digital image of the digital color mixing paint palette,
   wherein the digital paintbrush tool and the digital paint palette are configured to interact with the digital coloring environment presented on the touch-screen surface of the computing device executing the digital coloring tools kit application.

8. The digital coloring tools kit of claim 7, wherein upon executing the digital coloring tools kit application by the computing device, the digital coloring tools kit application is configured to generate the digital coloring environment comprising the digital paint palette for display by the computing device.

9. The digital coloring tools kit of claim 8, wherein the digital coloring tools kit application is configured to generate a corresponding response based on interaction of the digital paintbrush tool with the touch-screen surface of the computing device displaying the digital coloring environment.

10. The digital coloring tools kit of claim 9, wherein the interaction of the digital paintbrush tool with the touch-screen surface of the computing device comprises interaction of the digital paintbrush tool with the digital paint palette.

11. The digital coloring tools kit of claim 10, wherein a mixing area of the digital paint palette is configured to receive an indication of a first selected paint color based on interaction of the digital paintbrush tool with a first opening of the digital paint palette.

12. The digital coloring tools kit of claim 11, wherein the mixing area of the digital paint palette is configured to receive an indication of a second selected paint color based on interaction of the digital paintbrush tool with a second opening of the digital paint palette.

13. The digital coloring tools kit of claim 12, wherein upon receiving the indication of the first selected paint color and the indication of the second selected paint color, the mixing area is configured to indicate a mixed paint.

14. The digital coloring tools kit of claim 7, wherein the kit further comprises a digital stamper.

15. The digital coloring tools kit of claim 14, wherein the digital coloring tools kit application is configured to generate a corresponding response based on interaction of the digital stamper with the touch-screen surface of the computing device displaying the digital coloring environment.

16. A method of providing an interactive digital coloring tools environment, the method comprising:
receiving an indication of a digital coloring tools application; and
executing the digital coloring tools application by a computing device, wherein executing the digital coloring tools application comprises presenting, on a touch-screen display of the computing device, an interactive digital coloring environment comprising a digital color mixing paint palette,
wherein the interactive digital coloring environment is dynamically generated in response to user inputs received by the touch-screen display and corresponding to at least a portion of the interactive digital coloring environment,
wherein the user inputs received by the touch-screen display correspond to at least one of the following:
(1) a digital paintbrush tool;
(2) a digital stamper; and
(3) interaction with one or more color mixing features of the digital color mixing paint palette.

17. The method of claim 16, wherein the digital paint palette comprises at least one opening indicating at least one paint color and at least one mixing area.

18. The method of claim 17, wherein the interactive digital coloring environment is configured to receive at least one mixed paint stroke indication corresponding to a mixed paint color generated in the at least one mixing area.

* * * * *